United States Patent
Armstrong et al.

(10) Patent No.: US 10,640,225 B2
(45) Date of Patent: May 5, 2020

(54) SELECTIVELY REGULATING CURRENT IN DISTRIBUTED PROPULSION SYSTEMS

(71) Applicant: Rolls-Royce North American Technologies, Inc., Indianapolis, IN (US)

(72) Inventors: Michael James Armstrong, Avon, IN (US); Andrew Mark Bollman, Plainfield, IN (US); David Loder, Carmel, IN (US)

(73) Assignee: Rolls-Royce North American Technologies, Inc., Indianapolis, IN (US)

( * ) Notice: Subject to any disclaimer, the term of this patent is extended or adjusted under 35 U.S.C. 154(b) by 0 days.

(21) Appl. No.: 15/784,582

(22) Filed: Oct. 16, 2017

(65) Prior Publication Data

US 2019/0009920 A1   Jan. 10, 2019

Related U.S. Application Data

(60) Provisional application No. 62/530,684, filed on Jul. 10, 2017.

(51) Int. Cl.
  *B64D 31/06*    (2006.01)
  *B64D 27/24*    (2006.01)
  (Continued)

(52) U.S. Cl.
  CPC ............. *B64D 31/06* (2013.01); *B64D 27/24* (2013.01); *H02J 3/005* (2013.01); *H02J 3/06* (2013.01);
  (Continued)

(58) Field of Classification Search
  None
  See application file for complete search history.

(56) References Cited

U.S. PATENT DOCUMENTS

| | | |
|---|---|---|
| 4,114,555 A | 9/1978 | O'Brien, Jr. |
| 4,661,714 A | 4/1987 | Satterthwaite et al. |

(Continued)

FOREIGN PATENT DOCUMENTS

| | | |
|---|---|---|
| EP | 2192681 A1 | 6/2010 |
| EP | 3222510 A1 | 9/2017 |
| WO | 2014158240 A2 | 10/2014 |

OTHER PUBLICATIONS

Felder et al., "Turboelectric Distributed Propulsion in a Hybrid Wing Body Aircraft," American Institute of Aeronautics and Astronautics, Inc., 2011, 20 pp. (Applicant points out, in accordance with MPEP 609.04(a), that the year of publication, 2011, is sufficiently earlier than the effective U.S. filing date, 2017, so that the particular month of publication is not in issue.).

(Continued)

*Primary Examiner* — Tulsidas C Patel
*Assistant Examiner* — Joseph Ortega
(74) *Attorney, Agent, or Firm* — Shumaker & Sieffert, P.A.

(57) ABSTRACT

A distributed propulsion system includes a first propulsor and a second propulsor, a first generator configured to generate a first AC current, and a second generator configured to generate a second AC current. The system includes a power regulation circuit. The power regulation circuit includes a first current path that includes a first power electronics circuit, a second current path that includes a second power electronics circuit, a third current path that bypasses the first and second power electronics circuits, and a fourth current path that bypasses the first and second power electronics circuits. The power regulation circuit also includes a plurality of switches configured to selectively couple each respective input to a respective selected output to cause a respective current to flow from the respective (Continued)

input to the respective selected output via one of the first current path, second current path, third current path, or fourth current path.

20 Claims, 18 Drawing Sheets

(51) Int. Cl.
  *H02J 3/12* (2006.01)
  *H02J 3/06* (2006.01)
  *H02J 3/00* (2006.01)
  *H02P 101/30* (2015.01)
(52) U.S. Cl.
  CPC ............ *H02J 3/12* (2013.01); *B64D 2221/00* (2013.01); *H02P 2101/30* (2015.01)

(56) References Cited

U.S. PATENT DOCUMENTS

| | | | |
|---|---|---|---|
| 4,927,329 A * | 5/1990 | Kliman | F01D 7/00 416/127 |
| 8,425,267 B2 | 4/2013 | Harpin et al. | |
| 10,008,856 B2 | 6/2018 | Pan et al. | |
| 2003/0107352 A1* | 6/2003 | Downer | B60L 15/2045 322/40 |
| 2005/0012339 A1* | 1/2005 | Mikhail | F03D 7/0224 290/44 |
| 2007/0077830 A1* | 4/2007 | Rzadki | B63G 13/02 440/6 |
| 2008/0284252 A1* | 11/2008 | Jones | H02J 3/01 307/82 |
| 2008/0308685 A1* | 12/2008 | Decker | B64C 11/305 244/53 R |
| 2009/0015063 A1* | 1/2009 | Michalko | H02J 5/00 307/19 |
| 2010/0094490 A1* | 4/2010 | Alston | B63H 21/17 701/21 |
| 2012/0256422 A1* | 10/2012 | Fradella | H02K 1/2793 290/55 |
| 2013/0033206 A1* | 2/2013 | Gallegos-Lopez | H02P 21/14 318/400.02 |
| 2013/0200691 A1* | 8/2013 | Crane | B63H 23/24 307/9.1 |
| 2013/0270902 A1 | 10/2013 | Andersen et al. | |
| 2014/0032002 A1* | 1/2014 | Iwashima | G05B 13/02 700/295 |
| 2014/0145448 A1* | 5/2014 | Lewis | B63H 21/17 290/55 |
| 2014/0161646 A1* | 6/2014 | Taillardat | H02P 27/14 417/410.1 |
| 2014/0197681 A1* | 7/2014 | Iwashima | B60R 16/03 307/9.1 |
| 2014/0333126 A1* | 11/2014 | Vyas | B60R 16/03 307/9.1 |
| 2015/0035286 A1* | 2/2015 | Stephens | B63H 21/22 290/4 A |
| 2015/0045976 A1* | 2/2015 | Li | H02J 4/00 700/295 |
| 2015/0103457 A1* | 4/2015 | Shander | H02J 3/006 361/88 |
| 2016/0052505 A1* | 2/2016 | Zhou | B60L 7/14 701/22 |
| 2016/0200436 A1 | 4/2016 | North et al. | |
| 2016/0236790 A1* | 8/2016 | Knapp | B64C 11/001 |
| 2016/0244158 A1 | 8/2016 | Fredericks et al. | |
| 2016/0355272 A1* | 12/2016 | Moxon | B64D 35/04 |
| 2016/0359324 A1* | 12/2016 | Knowles | B64D 47/00 |
| 2016/0365810 A1 | 12/2016 | Armstrong et al. | |
| 2017/0126069 A1* | 5/2017 | Martin | H02J 50/12 |
| 2017/0170764 A1* | 6/2017 | Blackwelder | H02P 9/14 |
| 2017/0253344 A1* | 9/2017 | Wangemann | B64D 27/24 |
| 2017/0298721 A1 | 10/2017 | Shin | |
| 2018/0062388 A1* | 3/2018 | Mathiesen | H02J 3/14 |
| 2018/0102644 A1* | 4/2018 | Perreault | H02J 1/00 |
| 2018/0112599 A1* | 4/2018 | Dalal | F02C 7/262 |
| 2018/0138716 A1* | 5/2018 | Bailey | H02J 3/14 |
| 2018/0187604 A1* | 7/2018 | Poumarede | B64D 35/08 |
| 2018/0375327 A1* | 12/2018 | Eddins | H02J 3/14 |

OTHER PUBLICATIONS

Campbell, "Architecting Aircraft Power Distribution Systems Via Redundancy Allocation," Georgia Institute of Technology, Dec. 2014, 352 pp.
Felder, "NASA N3-X with Turboelectric Distributed Propulsion," IMechE Distributive Green Propulsion Technologies Conference, Nov. 16-17, 2014, 18 pp.
Jones et al., "Protection System Considerations for DC Distributed Electrical Propulsion Systems," SAE Aerotech Congress and Exhibition, 2015, 10 pp. (Applicant points out, in accordance with MPEP 609.04(a), that the year of publication, 2015, is sufficiently earlier than the effective U.S. filing date, 2017, so that the particular month of publication is not in issue.).
Armstrong et al., Architecture, Voltage, and Components for a Turboelectric Distributed Propulsion Electric Grid, NASA/CR-2015-218440, Jul. 2015, 270 pp.
Armstrong et al., "Propulsion System Component Considerations for NASA N3-X Turboelectric Distributed Propulsion System", SAE Int. J. Aerpsp., Oct. 22, 2012, 10 pp.
Armstrong et al., Advanced Hybrid-Electric Architectures "Implications of distribution voltage configuration on TeDP electrical systems", Aircraft Engineering and Aerospace Technology: An International Journal, vol. 86, No. 6, 501-508, 2014, 8 pp. (Applicant points out, in accordance with MPEP 609.04(a), that the year of publication 2014, is sufficiently earlier than the effective U.S. filing date, 2017, so that the particular month of publication is not in issue.).
U.S. Appl. No. 15/341,554 filed Nov. 2, 2016 by Michael James Armstrong et al.
Office Action from U.S. Appl. No. 15/341,554, dated Apr. 5, 2019, 16 pp.
Response to Office Action dated Apr. 5, 2019, from U.S. Appl. No. 15/341,554, filed Jul. 5, 2019, 12 pp.
Office Action from U.S. Appl. No. 15/341,554, dated Oct. 31, 2019, 18 pp.
Notice of Allowance from U.S. Appl. No. 15/341,554, dated Jan. 15, 2020, 10 pgs.
Office Action from U.S. Appl. No. 151341,554, dated Oct. 31, 2019, 19 pp.
Response to Office Action from U.S. Appl. No. 15/341,554, dated Oct. 31, 2019, filed Dec. 31, 2019, 8 pp.

* cited by examiner

SELECTIVELY REGULATING CURRENT IN DISTRIBUTED PROPULSION SYSTEMS

The application claims the benefit of U.S. Provisional Application No. 62/530,684, filed Jul. 10, 2017, the entire contents of which is incorporated by reference herein.

TECHNICAL FIELD

The disclosure relates to techniques for controlling distributed propulsion systems.

BACKGROUND

Some aircraft use turboelectric distributed propulsion (TeDP) systems for distributing electrical power from onboard generators to one or more propulsors to provide all or a portion of the overall thrust for a vehicle. A distributed propulsion system is a type of propulsion system, used for conventional takeoff and landing (CTOL) and/or vertical takeoff and landing (VTOL) aircraft, in which propulsors are distributed about the vehicle. Each propulsor may include a motor for driving a propeller or fan that rotates at a designated speed to propel a vehicle.

SUMMARY

In one example, the disclosure is directed to a system that includes a first propulsor and a second propulsor; a first generator configured to generate a first AC current; and a second generator configured to generate a second AC current. The system also includes a power regulation circuit electrically coupled to the first propulsor via a first output, the second propulsor via a second output, the first generator via a first input, and the second generator via a second input. The power regulation circuit includes: a first current path comprising a first power electronics circuit, a second current path comprising a second power electronics circuit, a third current path that bypasses the first and second power electronics circuits, and a fourth current path that bypasses the first and second power electronics circuits. The power regulation circuit also includes a plurality of switches configured to selectively couple each respective input to a respective selected output to cause a respective current to flow from the respective input to the respective selected output via one of the first current path, the second current path, the third current path, or the fourth current path.

In another example, the disclosure is directed to a method that includes receiving, by a power regulation circuit of a distributed propulsion system, a first AC current from a first generator of the distributed propulsion system via a first input of the power regulation circuit. The method also includes receiving, by the power regulation circuit, a second AC current from a second generator of the distributed propulsion system via a second input of the power regulation circuit. The power regulation circuit is electrically coupled to a first propulsor via a first output and is electrically coupled to a second propulsor via a second output. The method further includes, controlling, by control circuitry of the distributed propulsion system, one or more of a plurality of switches of the power regulation circuit, to selectively couple each respective input to a respective selected output to cause a respective current to flow from the respective input to the respective selected output via one of a first current path, a second current path, a third current path, or a fourth current path, wherein the first current path includes a first power electronics circuit, the second current path includes a second power electronics circuit, the third current path bypasses the first and second power electronics circuits, and the fourth current path bypasses the first and second power electronics circuits.

In yet another example, the disclosure is directed to a system that includes a first propulsor and a second propulsor; a first generator configured to generate a first AC current; and a second generator configured to generate a second AC current. The system further includes a power regulation circuit electrically coupled to the first propulsor via a first output, the second propulsor via a second output, the first generator via a first input, and the second generator via a second input. The power regulation circuit includes a first current path comprising a first power electronics circuit, a second current path comprising a second power electronics circuit, a third current path that bypasses the first and second power electronics circuits, and a fourth current path that bypasses the first and second power electronics circuits. The system further includes means for selectively coupling each respective input to a respective selected output to cause a respective current to flow from the respective input to the respective selected output via one of the first current path, the second current path, the third current path, or the fourth current path.

The details of one or more examples are set forth in the accompanying drawings and the description below. Other features, objects, and advantages of the disclosure will be apparent from the description and drawings, and from the claims.

DETAILED DESCRIPTION

Figure 1:
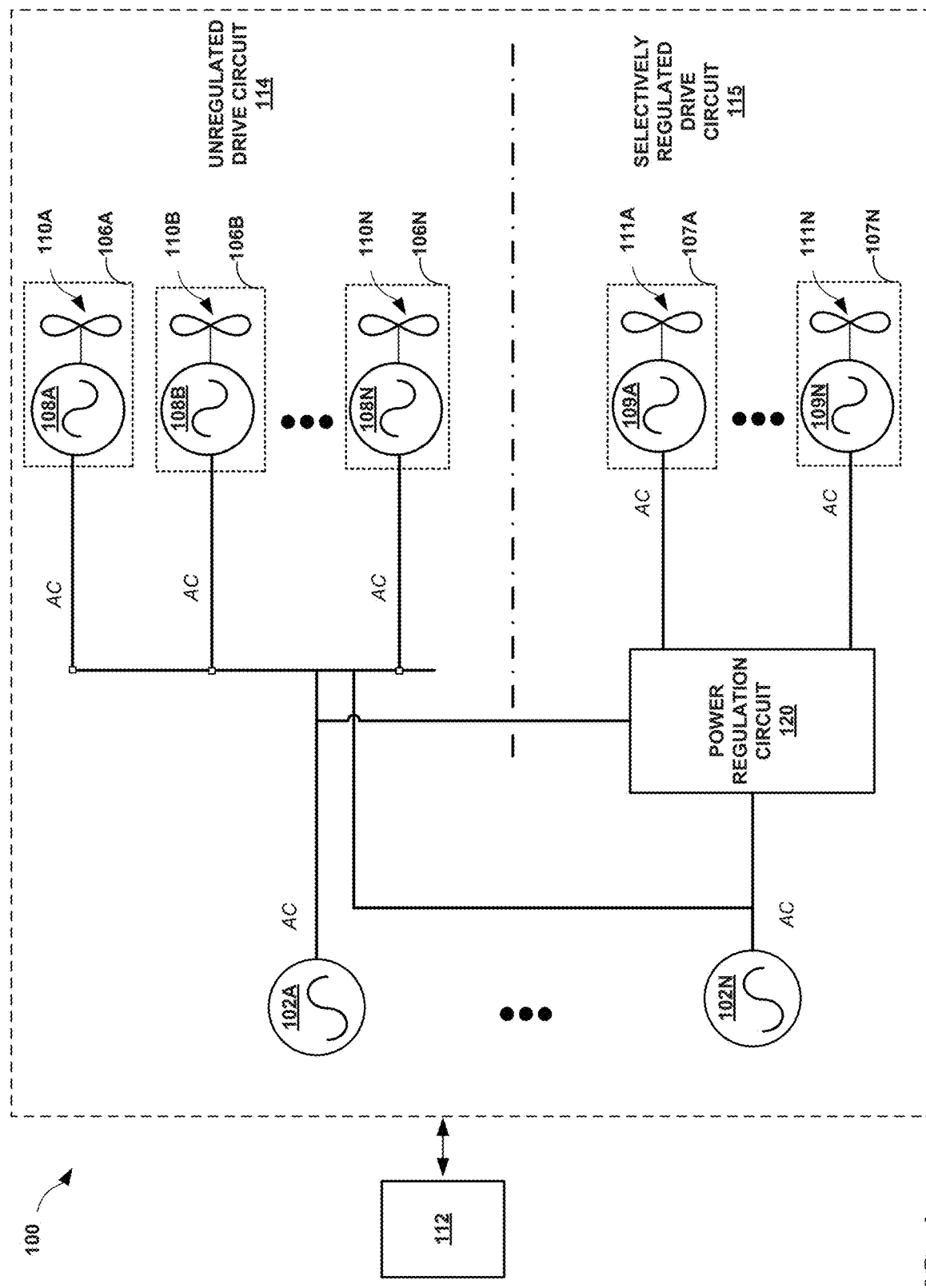
FIG. 1 is a conceptual diagram illustrating an example distributed propulsion system that selectively regulates electrical current to one or more propulsor motors, in accordance with one or more aspects of the present disclosure.

Some TeDP systems may drive each propulsor motors directly, using variable frequency, AC electrical current that is output by an AC turbogenerator (e.g., being driven by a turboshaft engine or other device). When driving propulsor motors by a variable frequency AC electrical current, the propulsor motors maintain speed synchronicity with the generator (e.g., a fixed ratio of rotational speed to AC frequency). As such, thrust modulation might only be achieved via engine shaft speed control or variable pitch mechanisms.

Other TeDP systems may drive each propulsor motor indirectly via a DC electrical current distribution system (e.g., DC microgrid) that is powered by an AC turbogenerator being driven by a turboshaft engine. When driving propulsion motors by a DC electrical current distribution system that is powered by an AC turbogenerator, thrust modulation may be achieved via motor speed controller variable pitch mechanisms. In other words, a DC electrical current distribution system may include power electronics to regulate the electrical current to one or more propulsor motors (e.g. by using an AC-DC-AC converter to regulate the frequency of the current), which may enable the propulsion system to adjust the speed of the propulsor motor. However, such propulsion systems may be heavier than a purely AC electrical power distribution system and may incur losses attributed to the AC-DC-AC conversion and the current distribution system.

In general, techniques and circuits of this disclosure may enable an example distributed propulsion system, such as a turboelectric distributed power (TeDP) system on a multi-propeller aircraft, to use AC and DC electrical current distribution systems for power distribution and thrust control. The AC distribution system may provide unregulated electrical power to a first group of propulsor motors, such that the frequency of the current received by the first group of propulsor motors equals the frequency of the current produced by an AC generator. The DC distribution system may selectively regulate electrical power to a second group of propulsor motors, such that the frequency of the current received by the second group of propulsor motors may be different than the frequency of the current produced by the AC generator.

For example, a multi-propulsor aircraft may include one or more bulk propulsors powered by an AC portion of an example propulsion system for "bulk" or primary thrust production. The aircraft may modulate the bulk thrust by controlling the shaft speed of the engine that is driving the AC generator supplying current to the AC portion.

In addition, the multi-propulsor aircraft may include one or more yaw control propulsors powered by a DC portion of the example propulsion system for yaw control or secondary thrust production. The aircraft may modulate the yaw control thrust production by individually controlling the motor speed of the one or more yaw control propulsors in the DC electrical current distribution system. Thus, the example propulsion system may provide finer control of its yaw control thrust independent of AC generator speed using variable motor speed control.

The aircraft may selectively regulate the electrical power distributed to the yaw control propulsors. For example, at a first time (e.g., when controlling yaw, such as during a turning maneuver), the DC electrical current distribution system may utilize a power regulation circuit to regulate (e.g., adjust) the electrical current to one or more yaw control propulsors. For instance, the power regulation circuit may include power electronics circuitry to regulate the frequency of the current. At a second time (e.g., during a nominal state where yaw control is not needed), the DC electrical current distribution system may refrain from regulating the electrical current to the yaw control propulsors by bypassing the power electronics. The example systems described herein may also provide redundancy, as each power regulation circuit may include multiple current paths, including multiple power electronics circuitry. Further, the example systems may allow synchronization between propulsors, e.g., upon desynchronization events or start-up of the distributed propulsion system.

By utilizing a combination of AC and DC electrical current distribution, the example propulsion system may weigh less and operate with fewer losses to provide bulk thrust production than other propulsion systems that rely only on DC distribution systems to (e.g., systems using AC-DC-AC power electronics) to control the propulsor motors. By selectively regulating the electrical current in the DC distribution system, the example propulsion system may utilize the power electronics only as needed (e.g., when controlling yaw, such as during a turning maneuver), thus potentially reducing the losses caused by the power regulation circuit. Therefore, an aircraft that relies on the example propulsion system as described herein may operate more efficiently, cost less, and have a greater operating range than other aircraft propulsion systems.

FIG. 1 is a conceptual diagram illustrating system 100 of an example distributed propulsion system that selectively regulates electrical current to one or more propulsor motors, in accordance with one or more aspects of the present disclosure. Although described generally with respect to aircrafts, the techniques of this disclosure may also apply to other vessels (e.g., marine craft) that rely on turbo electric distributed propulsion systems.

Electric propulsion system 100 is an electrical distribution system that may be found on some aircraft for distributing electrical current to one or more propulsor motors that provide thrust, for example, a combination of bulk and yaw control thrust. Electric propulsion system 100 includes a selectively regulated drive circuit 115 and an unregulated drive circuit 114. In some examples, system 100 may include additional or fewer components than those shown.

System 100 includes controller 112, one or more AC generators 102A-N (collectively, "AC generators 102"), a first group of propulsors 106A-106N (collectively, "propulsors 106"), and a second group of propulsors 107A-107N (collectively, "propulsors 107"). AC generators 102 generate a variable frequency AC electrical current and deliver AC electrical current to both unregulated drive circuit 114 and selectively regulated drive circuit 115. While described as three phase AC electrical current, the AC electrical current may include any number of phases.

AC generators 102 represents any high voltage or high current variable frequency, AC power source for use in an electric propulsion system such as system 100. AC generators 102 are configured to provide electrical power to system 100. For example, AC generators 102 may be a generator driven by a power unit, such as a turboshaft engine, an internal combustion engine, or the like. In some examples, AC generators 102 may have independent sets of windings which are dedicated to a respective propulsor motor (essentially one winding set per motor) or which are dedicated to subset of the motors. In other examples, AC generators 102 has only a shared set of windings associated with all of the propulsor motors.

Unregulated drive circuit 114 includes a plurality of propulsors 106. Each propulsor of propulsors 106 includes one of propulsor motors 108A-N (collectively, propulsor motors 108) and one of propulsor fans 110A-110N (collectively "propulsor fans 110"). Each propulsor motor 108 may be an AC induction motor (e.g., a low-asynchronous motor). Propulsors 106 are configured primarily to provide bulk thrust to the aircraft that includes system 100, by simultaneously being driven by the AC electrical current that is distributed by unregulated drive circuit 114.

Selectively regulated drive circuit 115 includes a plurality of propulsors 107. Each of propulsors 107 includes one of propulsor motors 109A-N (collectively, propulsor motors 109) and one of propulsor fans 111A-111N (collectively "propulsor fans 111"). Propulsors 107 may be primarily configured to provide yaw control thrust to the aircraft that includes system 100, by simultaneously being driven by the electrical current that is distributed by selectively regulated drive circuit 115.

Propulsors 106 and 107 may be variable pitch propulsors that are able to vary the pitch angle of a respective propulsor fan 110 and 111 that is being driven, during operation, by a respective propulsor motor 108 and 109. Propulsors 106 and 107 may be variable area nozzle propulsors that are able to vary the nozzle area of a respective propulsor fan 110 and 111 that is being driven, during operation, by a respective propulsor motor 108 and 109.

In addition to, or as part of, a respective propulsor motor 108, 109 and a respective propulsor fan 110, 111, each of propulsors 106,107 may include a pitch controller or nozzle controller (neither of which is shown) for varying the pitch or nozzle area of the respective propulsor fan 110, 111. For example, propulsor 106A may receive a signal or message from controller 112 that causes propulsor 106A to alter the pitch angle of propulsor fan 110A. In response to the signal, the pitch controller of propulsor 106A may change the pitch of propulsor fan 110A accordingly which may increase or decrease the speed of fan 110A.

Each of the plurality of propulsor motors 108 and 109 represents any type of motor for receiving electrical current provided by an electric propulsion system and converting the electrical current to mechanical motion. Propulsor motors 108 and 109 are shown in FIG. 1 as being propulsion motors for an aircraft, for example, for driving propulsor fans 110 and 111. In some examples, propulsor motors 108 and 109 may include additional sensors and/or feedback circuitry for providing information (e.g., voltage, current, rotational speed, frequency, phase, etc.) back to the components of system 100 that are used to control motors 108 and 109, such as controller 112.

Unregulated drive circuit 114 is configured to distribute the AC electrical current provided by AC generators 102 to each of motors 108 for powering propulsors 106. In some examples, motors 108 and fans 110 of propulsors 106 may rotate at a speed that is a fixed ratio of the rotational frequency or speed associated with AC generators 102 (e.g., the frequency or speed associated with the engine that is driving AC generators 102). In other words, unregulated drive circuit 114 may distribute unregulated electrical current from AC generators 102 to propulsors 106. That is, the frequency of the unregulated AC current that is distributed to propulsors is not adjusted by a power electronics circuit, such that the frequency of the unregulated AC current is the same frequency as the frequency of the AC current generated by one of generators 102.

Selectively regulated drive circuit 115 is configured to selectively regulate the electrical current provided to propulsors 107. For example, power regulation circuit 120 of selectively regulated drive circuit 115 may include a plurality of inputs that are each configured to receive AC current from a respective generator of generators 102 and a plurality of outputs that are each configured to distribute AC current to a respective propulsors of propulsors 107. Power regulation circuit 120 may also include a plurality of current paths, such that the current that flows from one or more generators 102 to one or more propulsors 107 may be selectively regulated. One or more of the current paths may include power electronics (e.g., a rectifier and an inverter in series). For instance, power regulation circuit 120 may include a first current path that includes a first power electronics circuit and a second current path that includes a second power electronics circuit. Power regulation circuit 120 may selectively utilize the power electronics to selectively convert the AC electrical current from AC generators 102 to DC electrical current, and convert the DC electrical current back to AC electrical current with selected characteristics (e.g., a selected frequency) than the AC electrical current generated by the AC generators 102. Power regulation circuit 120 may include at least one bypass current path to distribute electrical current to propulsors 107 without using the power electronics. For instance, power regulation circuit 120 may include a third current path that bypasses the first and second power electronics circuits and a fourth current path that bypasses the first and second power electronics circuits. Power regulation circuit 120 may also include a plurality of switches (e.g., circuit breakers, mechanical contactors, solid-state devices, relays, or the like) that are selectively controllable to route current from a particular input of power regulation circuit 120 to a particular output of power regulation circuit 120 along one of the current paths.

In some examples, power regulation circuit 120 may be utilized to synchronize one or more of propulsors 106 or propulsors 107. For example, power regulation circuit 120 may be used to drive one of motors 106 to a specific frequency, phase, and/or voltage in order to resynchronize with AC generators 102.

Controller 112 is configured to control how and when system 100 distributes, and refrains from distributing, electrical current from AC generators 102 to propulsors 106 and 107. Controller 112 is shown as, generally, being operatively coupled to all of the components of system 100, including unregulated drive circuit 114 and selectively regulated drive circuit 115. Although not specifically shown in FIG. 1, controller 112 may also be operatively coupled to each of the individual components of unregulated drive circuit 114 and selectively regulated drive circuit 115. In other words, controller 112 may provide and/or receive signals and information, to and/or from each of the different components 102, 106, 107, 108, 109, 110, 111, 114, 115, and 120, and any other components required to cause system 100 to distribute, and refrain from distributing, electrical current from AC generators 102 to propulsors 106 and 107. For example, controller 112 may communicate with other control modules, such as a control module associated with power regulation circuit 120 and/or AC generators 102 to coordinate rotational speeds and potential load dynamics with AC generators 102 during operation and synchronization. Although controller 112 is generally described as being the primary unit for controlling each of the components of system 100 for performing the techniques described herein, in some examples, the individual components of drive circuits 114 and 115 may include additional functionality for performing some or all of the operations described below with respect to controller 112.

Controller 112 may include any suitable arrangement of hardware, software, firmware, or any combination thereof, to perform the techniques attributed to controller 112 herein. Examples of controller 12 include any one or more microprocessors, digital signal processors (DSPs), application specific integrated circuits (ASICs), field programmable gate arrays (FPGAs), or any other equivalent integrated or discrete logic circuitry, as well as any combinations of such components. When controller 112 includes software or firmware, controller 112 further includes any necessary hardware for storing and executing the software or firmware, such as one or more processors or processing units.

In general, a processing unit may include one or more microprocessors, DSPs, ASICs, FPGAs, or any other equivalent integrated or discrete logic circuitry, as well as any combinations of such components. Although not shown in FIG. 1, controller 112 may include a memory configured to store data. The memory may include any volatile or non-volatile media, such as a random access memory (RAM), read only memory (ROM), non-volatile RAM (NVRAM), electrically erasable programmable ROM (EEPROM), flash memory, and the like. In some examples, the memory may be external to controller 112 (e.g., may be external to a package in which controller 112 is housed).

Controller 112 may control the electrical current distribution via unregulated drive circuit 114 to propulsors 106 to provide bulk or primary thrust to system 100 and may control the electrical current distribution via selectively regulated drive circuit 115 to propulsors 107 to satisfy yaw control or secondary thrust needs of system 100. Controller 112 may control the thrust of each of propulsors 106 by controlling the rotational speed (e.g., shaft speed) of AC generators 102 and in some examples, by also controlling a pitch angle and/or nozzle areas of propulsors 106. Controller 112 may control the speed of each of propulsors 107 by individually controlling the motor speed of motors 109 and in some examples, by also controlling a pitch angle and/or nozzle areas of propulsors 107.

Controller 112 of system 100 may control unregulated drive circuit 114 and selectively regulated drive circuit 115 to distribute electrical current from AC generators 102 to cause propulsors 106 and 107 to simultaneously produce bulk and yaw control thrust. That is, rather than relying on either unregulated drive circuit 114 alone or selectively regulated drive circuit 115 alone, controller 112 controls both unregulated and selectively regulated drive circuits 114 and 115 simultaneously to power propulsors 106 and 107 of system 100.

For example, controller 112 may modulate the bulk thrust production from propulsors 106 by controlling the shaft speed of the engine that is driving AC generators 102 and supplying electrical current to unregulated drive circuit 114. In addition, controller 112 may modulate the yaw control thrust production from propulsors 107 by individually controlling the motor speed of the one or more motors 109 of DC propulsors 107 by controlling the frequency of the current distributed to motors 109. In some examples, controller 112 may use variable pitch control of a subset of propulsors 106 and/or 107 for additional bulk or yaw control thrust modulation.

In accordance with techniques of this disclosure, controller 112 may selectively regulate electrical current to one or more propulsors 107. In some examples, controller 112 may regulate the electrical current to one or more of propulsors 107 to control yaw (e.g., in response to receiving a command to turn the aircraft (or marine craft)), to compensate for an out-of-service propulsor of propulsors 106 or 107, to synchronize rotation of one or more propulsors of propulsors 106 or 107, or the like.

In some examples, while controlling yaw (e.g., during a turning maneuver), controller 112 of FIG. 1 may adjust the mechanical power (e.g., thrust) generated by one or more yaw control propulsors 107 to control yaw and turn the aircraft. For example, controller 112 may adjust the thrust of a given yaw control propulsor 107 by regulating current provided to one or more of propulsors 107 to adjust the speed of a propulsor motor and the propulsor fan.

In some examples, controller 112 may cause the power electronics of power regulation circuit 120 to adjust (e.g., increase or decrease) the frequency of the electrical current provided to one or more of propulsors 107 as compared to the frequency of the electrical current output by generators 102. For example, controller 112 may command power regulation circuit 120 to increase the frequency of the electrical current to one or more propulsors 107 on one side of the aircraft and/or decrease the frequency of the electrical current to one or more propulsors 107 on the other side of the aircraft to provide yaw control and make a turn. For instance, controller 112 may open one or more switches, close one or more switches, or both, to cause current to flow through a current path that includes power electronics. Controller 112 may control the power electronics to change the frequency of the AC current output to one or more of propulsors 107. While controller 112 is generally described as controlling the frequency of electrical current, in some examples, controller 112 regulates propulsors 107 using volts per hertz control, torque control, or other control mechanisms.

In some examples, controller 112 may determine that the electrical current to one or more propulsors of propulsors 107 does not need to be regulated. In other words, controller 112 may determine that one or more propulsors of the group of propulsors 107 should receive electrical current directly from AC generators 102 without changing the frequency of the electrical current. For example, in response to completing a turn maneuver, controller 112 may determine that propulsors 107 should operate with the same electrical current as propulsors 106. In other words, controller 112 may command power regulation circuit 120 to refrain from regulating the electrical current (e.g., by bypassing the power electronics of power regulation circuit 120) and distributing unregulated AC electrical current from AC generators 102 to propulsors 107. Said another way, controller 112 may open one or more switches, close one or more switches, or both, to cause current to flow through a current path that bypasses the power electronics. In some examples, controller 112 may cause power regulation circuit 120 to simultaneously regulate electrical current to a first one or more of propulsors 107 and not regulate electrical current to a second one or more of propulsors 107.

By relying on a combination of unregulated and selectively regulated drive circuits 114 and 115, system 100 may weigh less and operate with fewer losses to provide bulk thrust production from propulsors 106 than other propulsion systems that rely only on DC current distribution for propulsor thrust production. In addition, system 100 may provide finer control of yaw control thrust production from propulsors 107 than other propulsion systems that rely only on AC electrical current distribution for thrust production, since system 100 can control selected ones of propulsors 107 using variable motor speed control.

Further, by selectively regulating the electrical current distributed to the propulsors 107, system 100 may reduce the amount of time the power electronics are used to convert electrical current from AC to DC and back to AC electrical current. Reducing the amount of the time the power electronics are utilized may decrease the power losses caused by the power electronics, thus potentially increasing the efficiency of the aircraft. As such, an aircraft that relies on system 100 may operate more efficiently, cost less, and have a greater operating range than other aircraft.

Figure 2B:
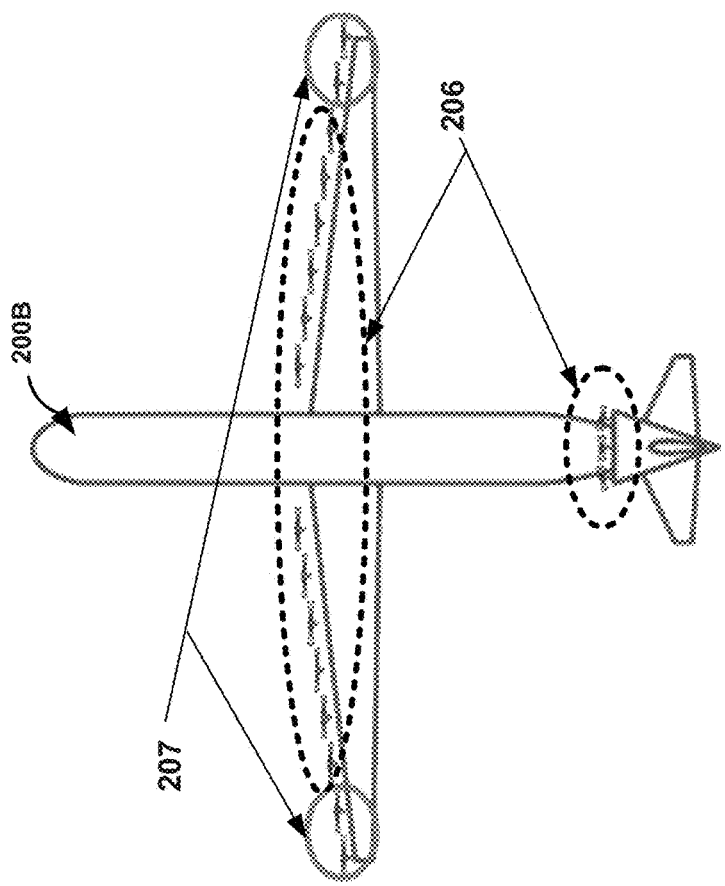
FIGS. 2A and 2B are conceptual diagrams illustrating example distributed propulsion aircraft that include example distributed propulsion systems that selectively regulate electrical current to one or more propulsor motors, in accordance with one or more aspects of the present disclosure.
Figure 2A:
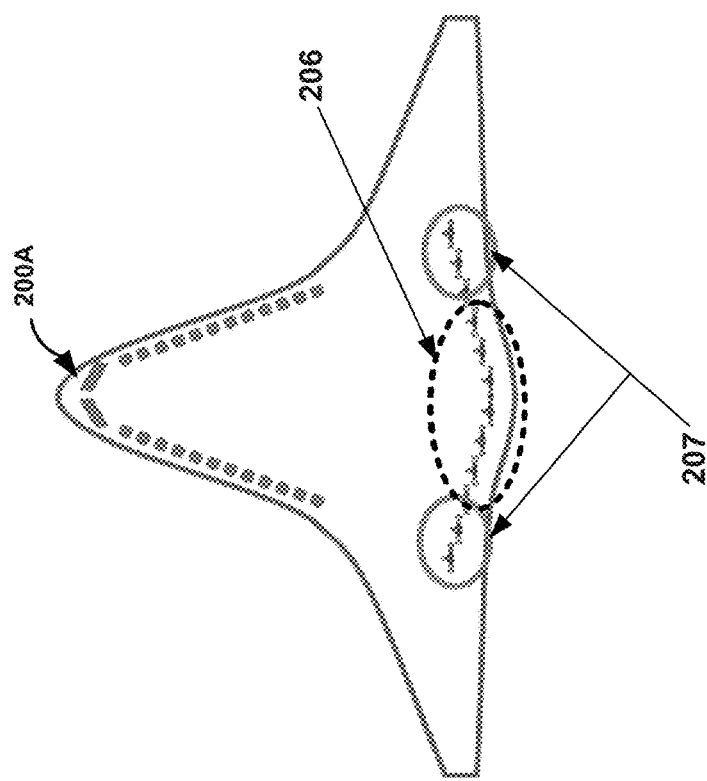

FIGS. 2A and 2B are conceptual diagrams illustrating example distributed propulsion aircraft that selectively regulate electrical current to one or more propulsor motors, in accordance with one or more aspects of the present disclosure. FIGS. 2A and 2B are described in the context of system 100 of FIG. 1. Aircrafts 200A and 200B of FIGS. 2A and 2B each include a first group of propulsors 206 and a second group of propulsors 207.

The example distributed propulsion aircraft 200A and 200B shown in FIGS. 2A and 2B benefit by coupling the aerodynamic and propulsive functions of the vehicle and decoupling the propulsive and power generation functions typically accomplished by a gas turbine. In so doing, the mass and efficiency of aircraft 200A and 200B is positively affected. In some distributed propulsion aircraft, this coupling is accomplished via boundary layer ingestion or deflected slipstream. For example, aircraft 200A is a blended wing body aircraft with boundary layer ingestion along the trailing edge of the center wing body.

When other aircraft use a DC distribution system to drive propulsors, dedicated inverters for each propulsor may be used to manage the variable frequency AC signal that is used to drive the respective motor. Such a purely DC distribution system requires power electronics to first rectify and then invert the current.

The mass associated with large power electronics can be reduced or eliminated by relying on AC distribution systems and driving propulsors with variable frequency AC electrical current directly from the generator. However, a purely AC distribution system introduces the need to initiate and maintain synchronous operation of the propulsor motors to the turbo generator that is driving the propulsor motor. For an aircraft that relies purely on an AC distribution system, and also relies on fixed pitch propulsors, thrust modulation can only be provided by increasing and decreasing the power shaft speed on the engine or by disconnecting or decoupling propulsors.

Thrust modulation is valuable for yaw controls purposes. Thrust modulation can be achieved by adding a variable speed drive to a propulsor, or by adding a variable pitch mechanism to a propeller.

Aircraft 200A and 200B take advantage of the benefits of both AC and DC distribution for distributed propulsion by using both current distribution techniques. For aircraft 200A and 200B, not all propulsors 206 and 207 are tasked with yaw control of the aircraft. In fact, the majority of the propulsors 206 and 207 may be utilized for bulk thrust modulation rather than yaw control. For example, aircraft 200A and 200B may include a greater quantity of propulsors 206 that are used for bulk or primary thrust modulation than the quantity of propulsors 207 which are being used for yaw control thrust modulation.

Since aircrafts 200A and 200B only need to independently control the fan speed of propulsors 207 for yaw control thrust modulation, propulsors 207 may be placed on the selectively regulated distribution system while propulsors 206 that do not require independent control may be placed on the unregulated distribution system. As shown in FIGS. 2A and 2B, aircraft 200A and 200B may position propulsors 207 that are being powered by the DC distribution system at a greater distance from the centerline of aircraft 200A and 200B than propulsors 206. In other words, propulsors 207 may be positioned further outboard of aircrafts 200A and 200B, relative to propulsors 206. Positioning propulsors 207 at a greater distance from the aircraft centerline of aircrafts 200A and 200B than propulsors 206 may provide the largest moment arm for yaw control purposes.

By controlling propulsors in this manner, the amount of power electronics equipment required by aircraft 200A and 200B may be reduced as compared to other aircraft, which eliminates weight and losses from the system. Further, selectively regulating the electrical current may reduce the amount of time the power electronics are used, which may reduce the losses attributed to the power electronics.

Figure 3:
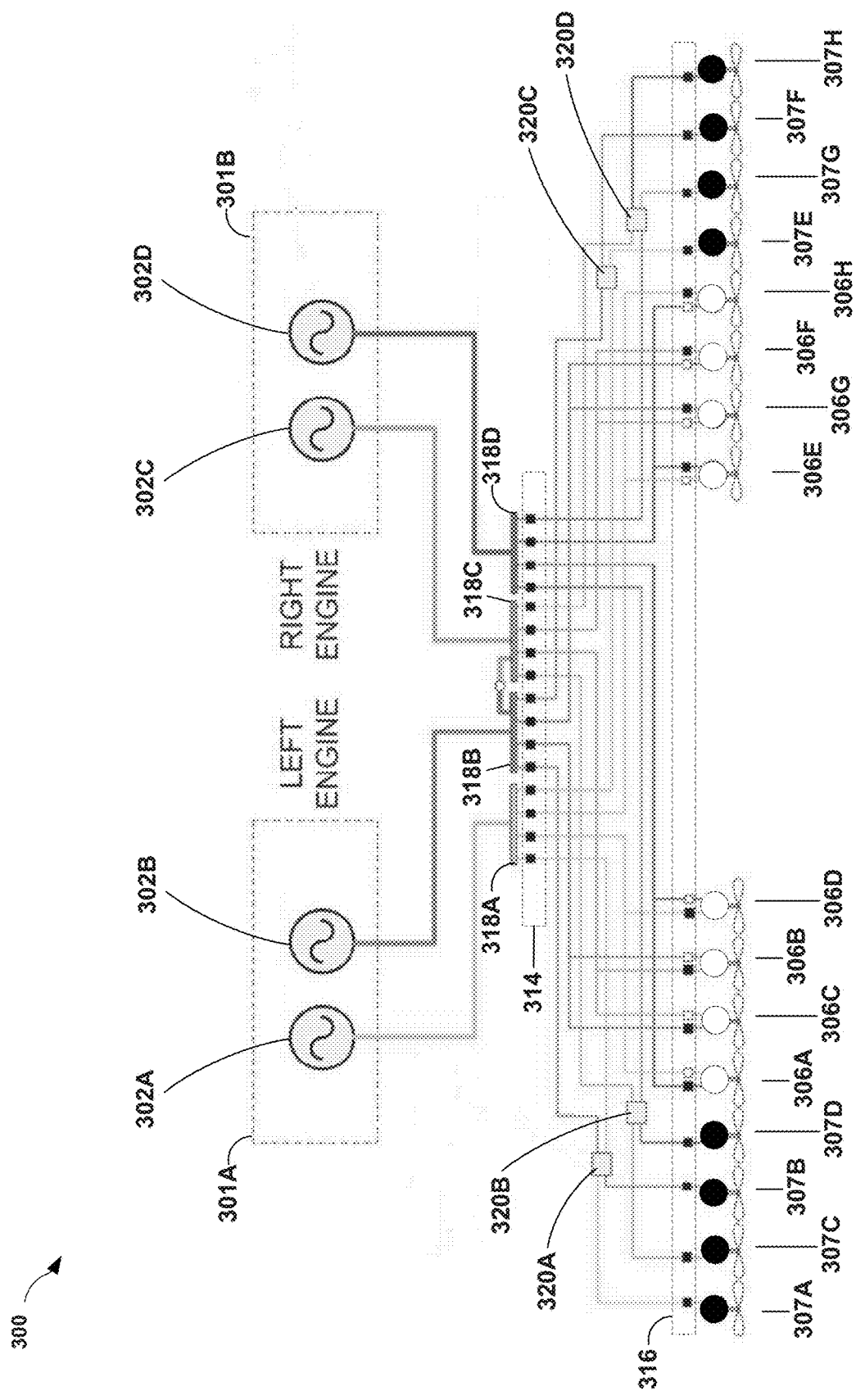
FIG. 3 is a conceptual diagram illustrating an example distributed propulsion system that selectively regulates electrical current to one or more propulsor motors, in accordance with one or more aspects of the present disclosure.

FIG. 3 is a conceptual diagram illustrating an example distributed propulsion system that selectively regulates electrical current to one or more propulsor motors, in accordance with one or more aspects of the present disclosure. FIG. 3 is described in the context of system 100 of FIG. 1. As illustrated in FIG. 3, distributed propulsion system 300 includes a left engine 301A and a right engine 301B (collectively, "engines 301"). Left engine 301A includes or is coupled to generators 302A and 302B and right engine 301B includes or is coupled to generators 302C and 302D (collectively, "generators 302"). Each generator of generators 302 is coupled to a respective electrical bus 318A-318D (collectively, "busses 318"). System 300 includes a first plurality of switches 314 and a second plurality of switches 316. System 300 also includes a plurality of thrust control propulsors 306A-306H (collectively, "thrust control propulsors 306") and a plurality of yaw control propulsors 307A-307H (collectively, "yaw control propulsors 307").

Switches 314 and 316 are selectively controllable (e.g., by controller 112 of FIG. 1) for selectively coupling or isolating the various components of system 300. That is, switches 314 and 316 are configurable for blocking voltages, interrupting currents and isolating conductors (e.g., physical or solid state interrupters) at the various components of system 300. Switches 314 and 316 may each include an isolation device, such as a switch, relay, circuit breaker, or other device configured to selectively permit the flow of current. The shading of a particular switch of switches 314, 316 indicates whether that switch is opened or closed. That is, dark indicates that a switch is closed, and white indicates that a switch is open. When closed, that switch transmits current, whereas the switch does not transmit current when that isolation device is open.

As illustrated in FIG. 3, each propulsor of propulsors 306, 307 may be configured to receive electrical current from one or more of generators 302 via a respective bus of busses 318.

For example, propulsor 306A may be selectively coupled to either generator 302A (of left engine 301A) via bus 318A or generator 302D (of right engine 301B) via bus 318D. For instance, a controller may close a first switch of switches 316 to couple propulsor 306A to generator 301D and open a second switch of switches 316 to decouple propulsor 306A from generator 301A. Similarly, propulsor 307A may receive electrical current from either generator 302A or generator 302B via power regulation circuit 320A. Because each propulsor of propulsors 306, 307 may receive current from more than one generator 302 (each of which may be coupled to a different engine 301) in some examples, system 300 may provide for redundant power to propulsors 306, 307 in case of a generator failure, a bus failure, or both.

System 300 includes a plurality of power regulation circuits 320A-320D (collectively, "power regulation circuits 320"). In some examples, each power regulation circuit 320 may be coupled to a plurality of yaw control propulsors 307, e.g., to two yaw control propulsors of yaw control propulsors 307. A particular power regulation circuit (e.g., power regulation circuit 320A) may be coupled to adjacent yaw control propulsors, non-adjacent yaw control propulsors, or a combination therein. As illustrated in FIG. 3, power regulation circuit 320A is coupled to non-adjacent yaw control propulsors 307A and 307B, power regulation circuit 320B is coupled to non-adjacent yaw control propulsors 307C and 307D, power regulation circuit 320C is coupled to non-adjacent yaw control propulsors 307E and 307F, and power regulation circuit 320D is coupled to non-adjacent yaw control propulsors 307G and 307H. In some instances, coupling power regulation circuit 320 to non-adjacent yaw control propulsors 307 may improve performance in the event that a particular power regulation circuit of power regulation circuits 320 fails. For instance, if power regulation circuit 320A fails such that yaw control propulsors 307A and 307B do not receive any power, power regulation circuit 320B may still provide power to yaw control propulsors 307C and 307D, which may provide yaw control. In other words, because yaw control propulsor 307C is the second outermost yaw control propulsor, yaw control propulsor 307C may provide a relatively large (compared to using a propulsor closer to the fuselage) thrust differential between a first side of the aircraft and a second side of the aircraft, while reducing the maximum power rating of the individual yaw control propulsors 307.

In some examples, a first group of yaw control propulsors (e.g., 307A-307D) may be located on a first (e.g., left) side of the aircraft and a second group of yaw control propulsors (e.g., 307E-307H) may be located on a second (e.g., right) side of the aircraft opposite the first group of propulsors. In other words, system 300 may include at least one power regulation circuit to regulate electrical current to yaw control propulsors on one side of the center line of the aircraft and at least one power regulation circuit to regulate electrical current to yaw control propulsors on the side opposite the center line of the aircraft.

Each power regulation circuit of power regulation circuits 320 may selectively regulate electrical current to the respective yaw control propulsors 307. For instance, a controller (e.g., controller 112 of FIG. 1) may receive a command to turn the aircraft. As a result, in some examples, the controller commands power regulation circuit 320A to increase the frequency of the electrical current to one or both of yaw control propulsors 307A and 307B and commands power regulation circuit 320D to decrease the frequency of electrical current to one or both of yaw control propulsors 307G and 307H. Thus, in these examples, power regulation circuits 320A and 320B may regulate the electrical current to the respective yaw control propulsors using power electronics circuits in the respective power regulation circuits.

In some examples, the controller may refrain from regulating electrical current to certain yaw control propulsors 307. For example, the controller may command power regulation circuits 320B and 320C to bypass the power electronics circuits in order to distribute unregulated electrical current to yaw control propulsors 307C and 307D and 307E and 307F, respectively.

Figure 4:
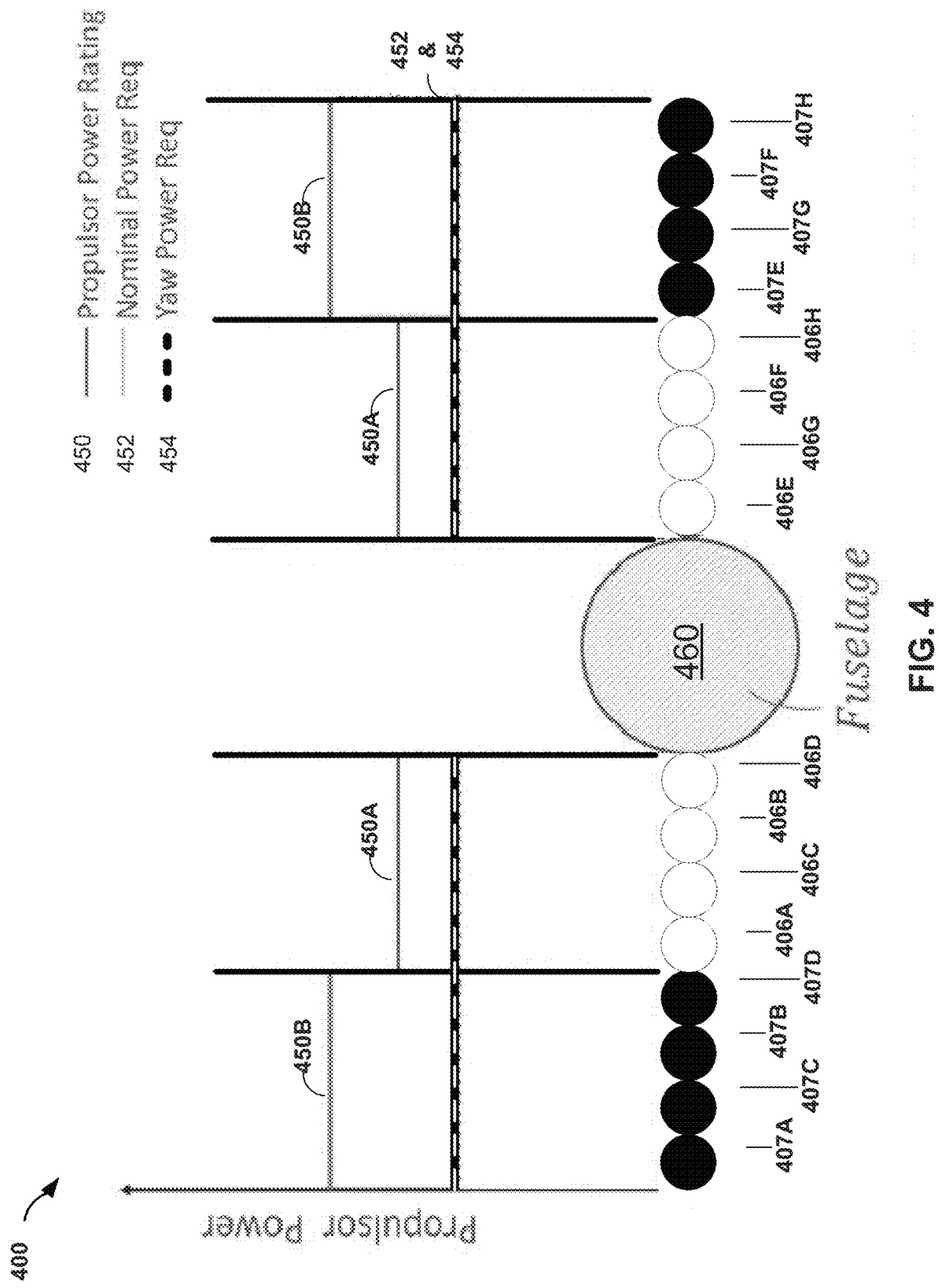
FIG. 4 is a conceptual diagram illustrating an example distributed propulsion system for an aircraft during nominal operation without yaw control, in accordance with one or more aspects of the present disclosure.

FIG. 4 is a conceptual diagram illustrating an example distributed propulsion aircraft during nominal operation without yaw control, in accordance with one or more aspects of the present disclosure. FIG. 4 is described in the context of systems 100 and 300 of FIGS. 1 and 3, respectively.

Aircraft 400 includes fuselage 460, a plurality of thrust control propulsors 406A-406H (collectively, "thrust control propulsors 406") and a plurality of yaw control propulsors 407A-407H (collectively, "yaw control propulsors 407"). Thrust control propulsors 406 may be rated to a first power rating 450A and yaw control propulsors 407 may be rated to a second power rating 450B. Power ratings 450A and 450B (collectively, "power ratings 450") be the same, or may be different. Aircraft 400 may include one or more power regulation circuits (such as power regulation circuits 320 of FIG. 3) configured to selectively regulate electrical current to one or more of yaw control propulsors 407.

In some examples, a controller (e.g., controller 112 of FIG. 1) may regulate the electrical current to one or more of yaw control propulsors 407 to control yaw and turn aircraft 400. The controller may adjust the electrical current to a given yaw control propulsor 407 by reducing the speed of a propulsor motor. In some examples, the controller may reduce the speed of one or more thrust control propulsors 406 by reducing the frequency of the AC electrical power provided to the motor of propulsors 406, for example, by reducing the speed of the generator(s).

In some examples, during nominal operation (e.g., when all engines, busses, and generators are operating normally and aircraft 400 is traveling in a straight line), the controller may command one or more power regulation circuits to refrain from regulating the electrical current to yaw control propulsors 407. Thus, in some examples of nominal flight operations, all propulsors 406, 407 may operate at a nominal power level 452. In other words, the frequency of the AC electrical current delivered to the motors of propulsors 406, 407 may be the same as the frequency of the electrical current generated by the generators. As such, the controller may cause each of the power regulation circuits to refrain from regulating current to propulsors 406, 407.

Figure 5:
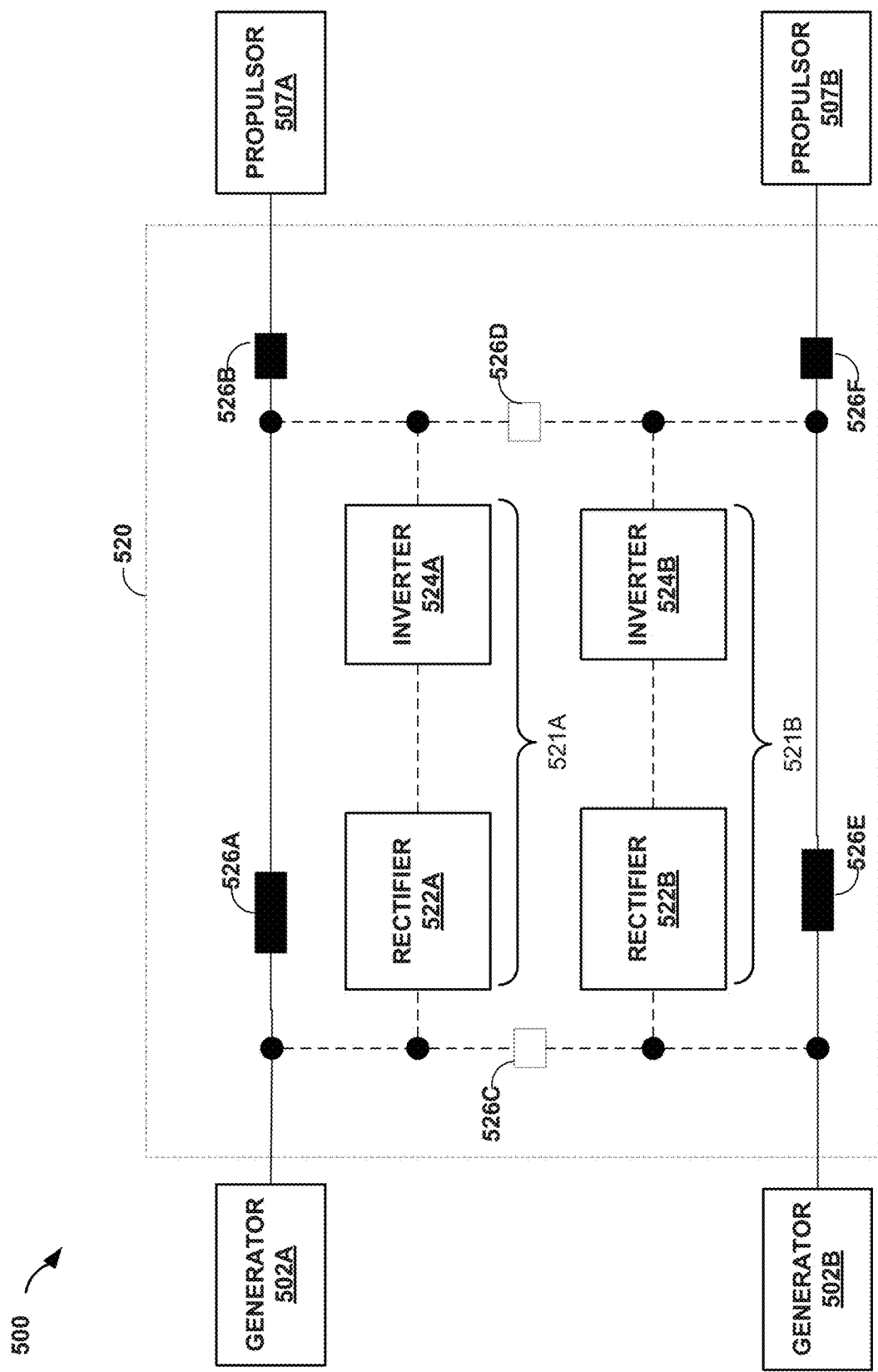
FIG. 5 is a conceptual diagram illustrating an example distributed propulsion system with a power regulation circuit operating in an unregulated mode, in accordance with one or more aspects of the present disclosure.

FIG. 5 is conceptual diagrams illustrating an example distributed propulsion system with a power regulation circuit operating in an unregulated mode, in accordance with one or more aspects of the present disclosure. FIG. 5 is described in the context of aircraft 400 of FIG. 4. System 500 includes a plurality of generators 502A and 502B (collectively, "generators 502"), power regulation circuit 520, and yaw control propulsors 507A and 507B (collectively, "propulsors 507"). Generators 502 may be driven by the same engine or by different engines. While illustrated as including two generators 502, power regulation circuit 520, and two propulsors 507, system 500 may include additional generators 502, power regulation circuits 520, or propulsors 507 (e.g., as illustrated in FIG. 3).

Power regulation circuit 520 may be selectively electrically coupled to a first generator 502A via a first input, to a second generator 502B via a second input, to a first yaw control propulsor 507A via a first output, and to a second yaw control propulsor 507B via a second output. As illustrated in FIG. 5, power regulation circuit 520 includes a plurality of current paths. In some examples, a first current path includes a first power electronics circuit 521A that includes a first rectifier 522A electrically coupled to a first inverter 524A. In some examples, a second current path includes a second power electronics circuit 521B that includes a second rectifier 522B electrically coupled to a second inverter 524B. In the example of FIG. 5, a third current path bypasses the first power electronics circuit 521A and the second power electronics circuit 521B (e.g., the third current path may include closed switch 526A such current may flow directly from the first input to the first output) and a fourth current path bypasses the first power electronics circuit 521A and the second power electronics circuit 521B (e.g., the fourth current path may include closed switch 526E such that current may flow directly from the second input to the second output).

The shading of first and second rectifiers 522A and 522B (collectively, "rectifiers 522") and first and second inverters 524A and 524B (collectively, "inverters 524") indicates whether current is flowing to the rectifiers 522 and inverters 524. That is, black or shaded indicates that a rectifier of rectifiers 522 and an inverter of inverters 524 receives current, and hence regulates AC electrical current from a generator of generators 502, and white or unshaded indicates that a rectifier of rectifiers 522 and an inverter of inverters 524 does not receive current, and hence does not regulate AC electrical current from a generator of generators 502.

Power regulation circuit 520 also includes a plurality of switches 526A-526F (collectively, "switches 526"). Switches 526 represent switches that are selectively controllable (e.g., by controller 112 or control circuitry of power regulation circuit 520) for isolating the various components of system 500 from generators 502. That is, switches 526 are configurable for blocking voltages, interrupting currents, and isolating conductors (e.g., physical or solid state interrupters) at the various components of system 500 that receive electrical current from generators 502. Switches 526 may include, for example, relays, circuit breakers, mechanical contactors, solid-state devices, or the like. The shading of switches 526 in FIG. 5 indicates whether that switch is opened or closed. That is, dark indicates that a switch of switches 526 is closed, and white indicates that a switch of switches 526 is open. When closed the switch transmits current, whereas when open, the switch does not transmit current. In other words, switches 526 are configured to selectively couple a respective input to a respective selected output, such that the controller may cause current to flow from a respective input to a respective input along one of the current paths.

In some examples, power regulation circuit 520 may include more or fewer power electronics circuits 521 and/or more of fewer switches 526. Further, power regulation circuit 520 may include fewer components and/or may include additional components not shown here.

Power regulation circuit 520 may selectively regulate electrical current to one or more of yaw control propulsors 507. For example, power regulation circuit 520 may selectively adjust the frequency of the AC electrical current provided to the propulsor motor in order to adjust the speed of the propulsor motor, thereby changing the thrust generated by a given yaw control propulsor of propulsors 507.

In the example of FIG. 5, a controller may command power regulation circuit 520 to refrain from regulating the electrical current to propulsors 507. In response to receiving the command to refrain from regulating the electrical current, power regulation circuit 520 may close (or keep closed) switches 526A and 526B to bypass rectifier 522A and inverter 524A. Thus, as shown by the solid black line from generator 502A to propulsor 507A, current may flow along the third path from generator 502A to propulsor 507A without going through the power electronics 521, such that the frequency of the electrical current received by propulsor 507A may equal the frequency of the electrical current generated by generator 502A. In other words, propulsor 507A may receive unregulated electrical current from generator 502A. Similarly, power regulation circuit 520 may close switches 526E and 526F, such that the current may flow along the fourth current path from generator 502B to propulsor 507B without being regulated by second rectifier 522B and second inverter 524B. Thus, in some examples of nominal operation, power regulation circuit 520 may distribute unregulated electrical current to propulsors 507, such that the speed of propulsors 507 is based on the frequency of the electrical current generated by generators 502.

Figure 6:
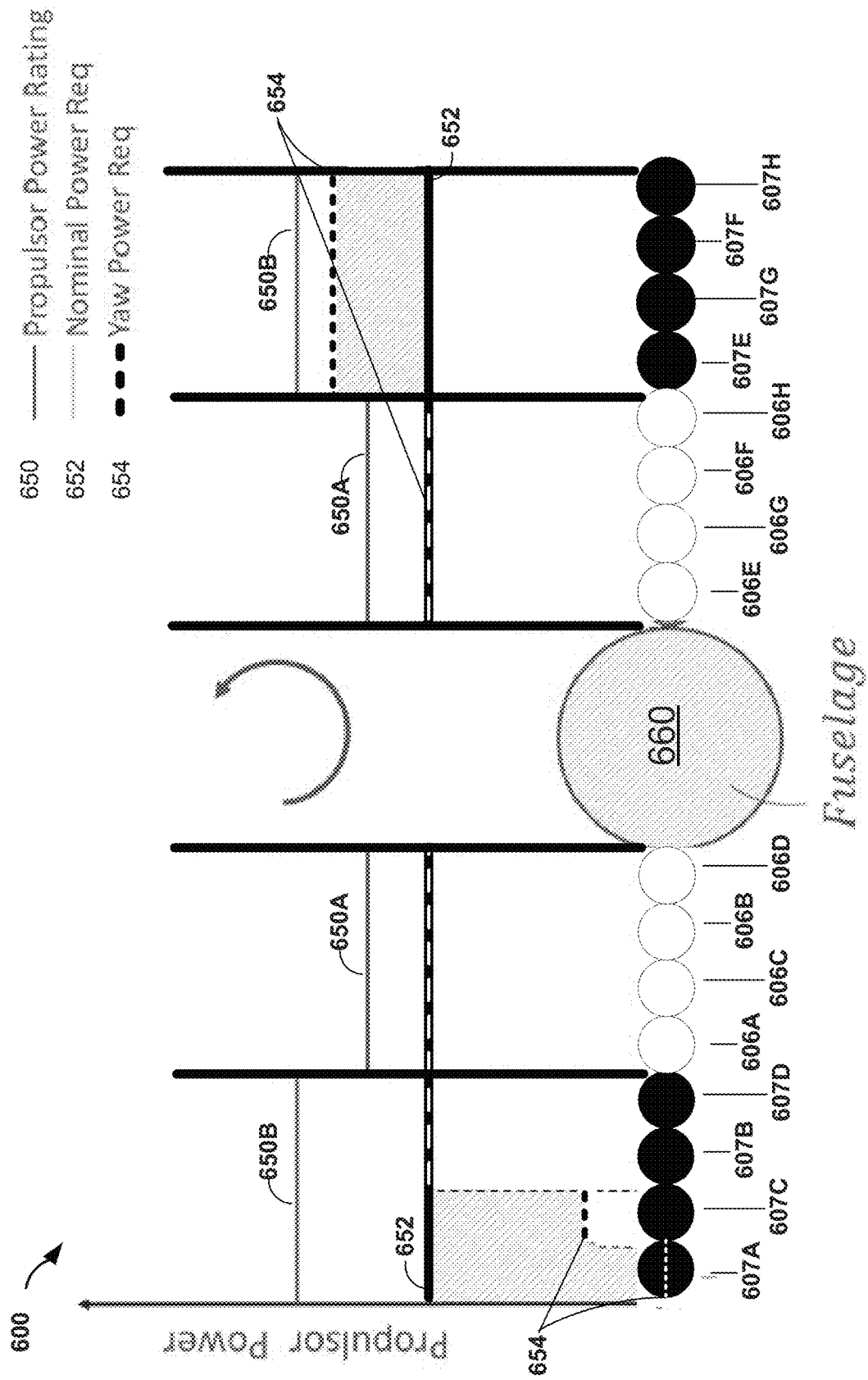
FIG. 6 is a conceptual diagram illustrating an example distributed propulsion system for an aircraft while controlling yaw, in accordance with one or more aspects of the present disclosure.

FIG. 6 is a conceptual diagram illustrating an example distributed propulsion aircraft while exerting yaw control, in accordance with one or more aspects of the present disclosure. FIG. 6 is described in the context of system 100 and 300 of FIGS. 1 and 3, respectively.

Aircraft 600 includes fuselage 660, a plurality of thrust control propulsors 606A-606H (collectively, "thrust control propulsors 606"), and a plurality of yaw control propulsors 607A-607H (collectively, "yaw control propulsors 607"). Thrust control propulsors 606 may be rated to a first power rating 650A and yaw control propulsors 607 may be rated to a second power rating 650B. Power ratings 650A and 650B (collectively, "power ratings 650") may be the same, or may be different. Aircraft 600 may include one or more power regulation circuits (such as power regulation circuits 320 of FIG. 3) configured to selectively regulate electrical current to one or more of yaw control propulsors 607.

In some examples, when controlling yaw (e.g., during a turning maneuver), a controller (e.g., controller 112 of FIG. 1 or control circuitry of a power regulation circuit) may adjust the electrical current to one or more yaw control propulsors 607 to exert yaw control and turn aircraft 600. For example, the controller may adjust the thrust generated by a given yaw control propulsor of propulsors 607 by adjusting the speed of a propulsor motor, and may adjust the speed of the propulsor motor by adjusting the frequency of the AC electrical current provided to the propulsor motor.

The controller may reduce the thrust generated by one or more of propulsors 607A-607D by reducing the frequency of the AC electrical current provided to the one or more propulsors. The controller may reduce the thrust generated by propulsors 607A-607D equally or unequally (e.g., one at a time). As illustrated in FIG. 6, in one scenario, the controller may reduce the thrust generated by propulsors 607A-607D unequally by first reducing the power consumed by, and hence thrust generated by, the outermost yaw control propulsor 607A from the nominal power level to a lower threshold power level before reducing the thrust generated by any of the other yaw control propulsors 607B-607D. Said another way, the controller may reduce the power consumed by (and thrust generated by) one or more of yaw control propulsors 607B-607D after the power consumed by propulsor 607A is less than or equal to a threshold power level. The lower threshold power level may be zero (or approximately zero) Watts, or some other power level such that propulsor 607A provides negligible thrust. As another example, the controller may reduce the thrust generated by one or more of yaw control propulsors 607B-607D in response to determining that the rotational speed of yaw control propulsor 607A is less than or equal to a threshold speed. In some instances, the controller may first reduce the power consumed by (and thrust generated by) the outermost yaw control propulsor 607A to the lower threshold power level to obtain a larger thrust differential between a first (e.g., left) side of aircraft 600 and a second (e.g., right) side of aircraft 600. In some instances, the controller may reduce the thrust generated by the next outermost yaw control propulsors 607C in response to reducing the power consumed by the outermost yaw control propulsor to the lower threshold power level. For instance, as illustrated by FIG. 6, the controller may reduce the power consumed by (and thrust generated by) propulsor 607C from the nominal power level 652 to another, lower power level while controlling yaw. In some examples, an upper threshold power level may be the maximum power rating for a particular propulsor.

In some examples, the controller may increase the thrust generated by a given yaw control propulsor 607 by increasing the speed of a propulsor motor, and may increase the speed of the propulsor motor by increasing the frequency of the AC electrical current provided to the propulsor motor. The controller may increase the thrust generated by yaw control propulsors 607E-607H equally or unequally. In some examples, the controller may increase the thrust generated by propulsors 607E-607H one at a time (e.g., starting with the outermost propulsor 607H), which may increase the thrust differential between the first and second sides of aircraft 600. In other examples, as illustrated in FIG. 6, the controller may increase the thrust generated by propulsors 607E-607H equally. In other words, the controller may increase the speed of propulsors 607E-607G while increasing the speed of propulsor 607H. Increasing the thrust equally may minimize or reduce the difference between the nominal power 652 consumed by propulsors 607E-607H and the yaw power 654 consumed by propulsors 607E-607H while controlling yaw. Reducing the difference between the nominal power 650 and the yaw power 652 provided while controlling yaw may reduce the maximum propulsor power rating 650 of the yaw control propulsors 607 (e.g., because the increased thrust can be provided over multiple propulsors rather than relying on a single propulsor), which may reduce the size, weight, complexity, and/or cost of yaw control propulsors 607 (e.g., relative to other systems with multiple yaw control propulsors).

Figure 7A:
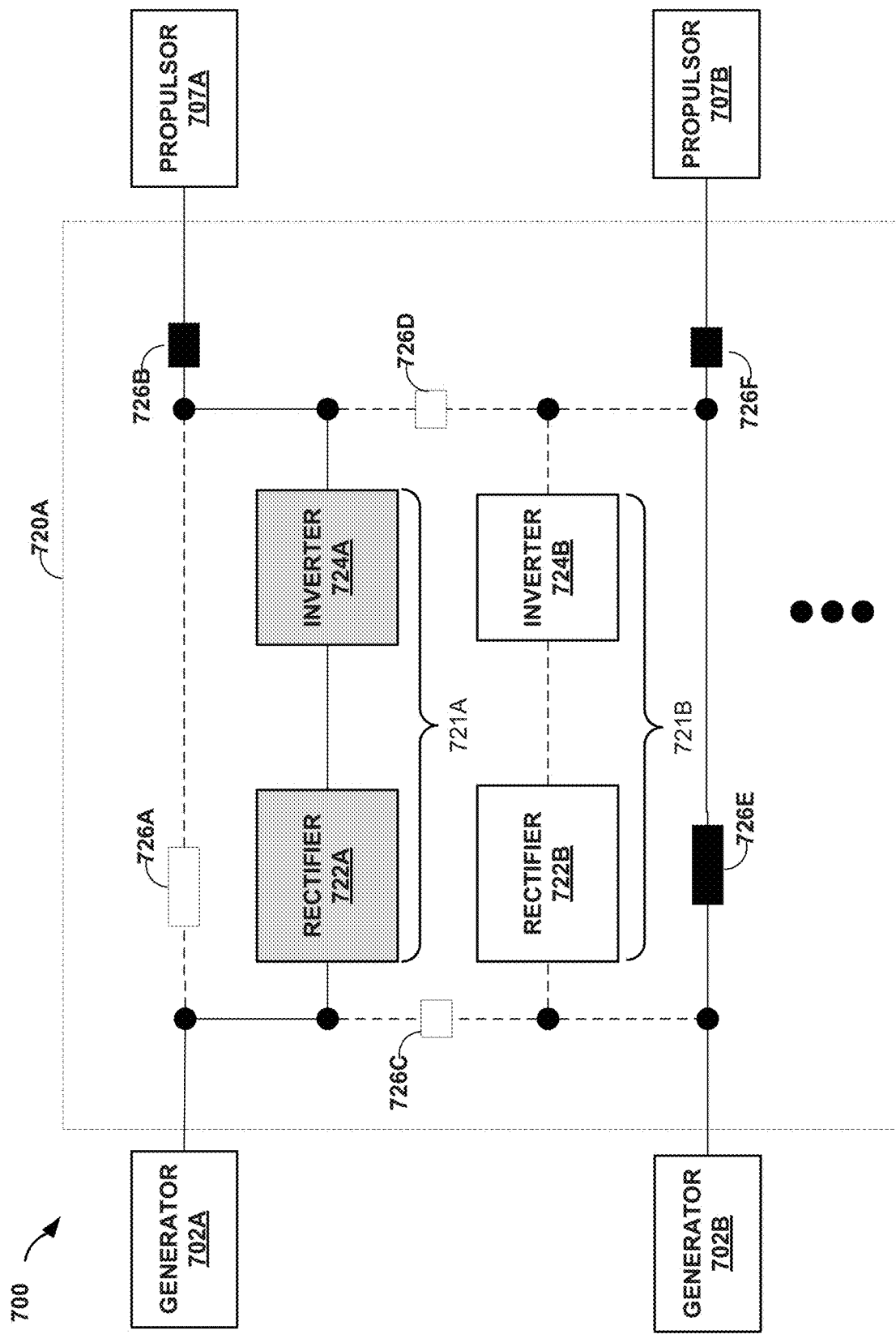
FIGS. 7A and 7B are conceptual diagrams illustrating an example distributed propulsion system while controlling yaw, in accordance with one or more aspects of the present disclosure.
Figure 7B:
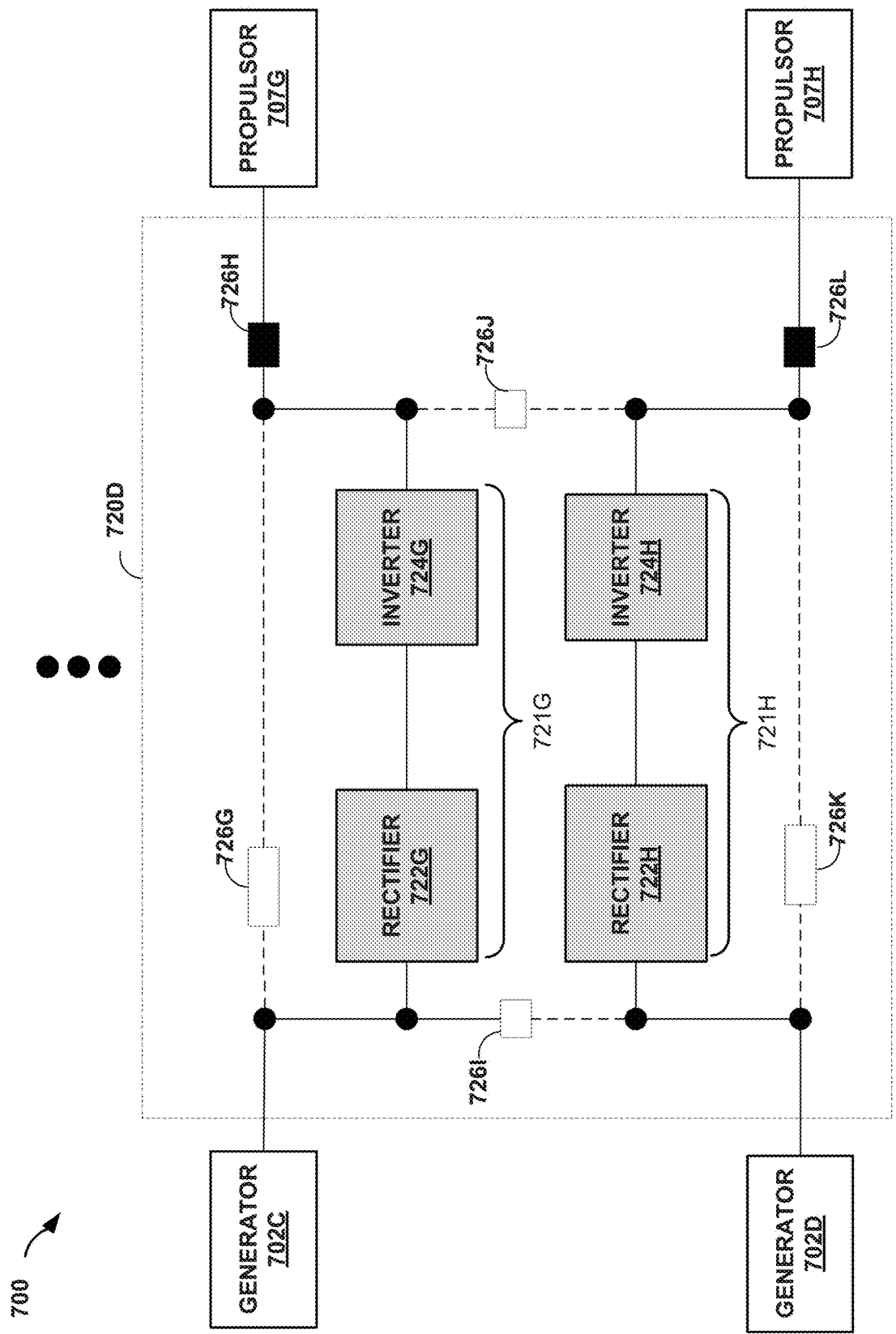

FIGS. 7A and 7B are conceptual diagrams illustrating an example distributed propulsion system while controlling yaw, in accordance with one or more aspects of the present disclosure. FIGS. 7A and 7B are described in the context of aircraft 600 of FIG. 6. System 700 of FIGS. 7A and 7B includes a plurality of generators 702A-702D (collectively, "generators 702"), a plurality of power regulation circuits 720A-720D (collectively, "power regulation circuits 720"), and a plurality of yaw control propulsors 707A-707H (collectively, "yaw control propulsors 707"). Generators 702 may be driven by the same engine or by different engines. While illustrated as having four generators 702, four power regulation circuits 720, and eight yaw control propulsors 707, system 700 may include additional or fewer generators 702, power regulation circuits 720, and yaw control propulsors 707. System 700 may include additional components not shown in FIG. 7, such as thrust control propulsors (e.g., thrust control propulsors 606 in FIG. 6).

Each power regulation circuit of power regulation circuits 720 are coupled to a plurality of generators 702 via respective inputs and to a plurality of yaw control propulsors 707 via respective outputs. For example, as illustrated in FIG. 7A, power regulation circuit 720A is coupled to a first generator 702A at a first input, to a first propulsor 707A at a first output, to a second generator 702B at a second input, and to a second propulsor 707B at a second output. Similarly, as illustrated in FIG. 7B, power regulation circuit 720D is coupled to a third generator 702C at a third input, to a third propulsor 707G at a third output, to a fourth generator 702D at a fourth input, and to a fourth propulsor 707H at a fourth output.

Power regulation circuits 720A-720D each include power electronics, such as rectifiers and inverters, to selectively regulate the electrical power provided to a particular yaw control propulsor of yaw control propulsors 707. For instance, power regulation circuit 720A includes a first power electronics circuit 721A that includes a first rectifier 722A electrically coupled to a first inverter 724A and a second power electronics circuit 720B that includes a second rectifier 722B electrically coupled to a second inverter 724B. Similarly, power regulation circuit 720D includes a third power electronics circuit 721H that includes a third rectifier 722G electrically coupled to a third inverter 724G and a fourth power electronics circuit 721H that includes a fourth rectifier 722H electrically coupled to a fourth inverter 724H. Power electronics circuits 721A-721H may collectively be referred to as power electronics circuits 721, rectifiers 722A-722H may collectively be referred to as rectifiers 722, and inverters 724A-724H may collectively be referred to as inverters 724.

Each power regulation circuit of power regulation circuit 720 includes a plurality of current paths to selectively couple a particular generator of generators 702 to a respective propulsor of propulsors 707. In some examples, one or more of the plurality of current paths include power electronics. For example, as illustrated in FIG. 7A, power regulation circuit 720A includes a first current path that includes the first power electronics circuit 721A, a second current path that includes the second power electronics circuit 721B, a third current path that bypasses the first power electronics circuit and the second power electronics circuit, and a fourth current path that bypasses the first power electronics circuit and the second power electronics circuit. As shown in FIG. 7B, power regulation circuit 720D includes a fifth current path that includes a third power electronics circuit 721G, a sixth current path that includes a fourth power electronics circuit 721H, a seventh current path that bypasses the third power electronics circuit and the fourth power electronics circuit, and an eighth current path that bypasses the third power electronics circuit and the fourth power electronics circuit.

Power regulation circuits 720 each include a plurality of switches. For instance, power regulation circuit 720A includes switches 726A-726F and power regulation circuit 720D includes switches 726G-726L. Switches 726A-726L may collectively be referred to as switches 726. In some examples, each power regulation circuit 720 may include more or fewer rectifier/inverter pairs and/or more of fewer switches 726. Further, each power regulation circuit 720 may include additional components not shown here.

Power regulation circuits 720 may selectively regulate electrical current to one or more of yaw control propulsors 707. For example, as illustrated in FIG. 7A, a controller (e.g., controller 112 of FIG. 1) may command power regulation circuit 720A to reduce electrical current to an outer yaw control propulsor 707A and to refrain from regulating the electrical current to an inner yaw control propulsor 707B (e.g., a propulsor that is closer to the center line of the aircraft containing propulsion system 700 as compared to the outermost propulsor 707A). For instance, power regulation circuit 720A may open (or keep open) switch 726A such that electrical current conducts through the first current path that includes rectifier 722A and inverter 724A, thus regulating the electrical current to propulsor 707A. For instance, when switch 726A is open, rectifier 722A may receive AC electrical current generated by generator 702A and convert the electrical current to a DC electrical current. Inverter 724A may receive the DC electrical current from rectifier 722A and convert the DC electrical current back to a regulated AC electrical current. In this way, propulsor 707A may receive regulated AC electrical current. In some instances, the regulated AC electrical current may have a different frequency than the AC electrical current generated by generator 702A.

As further illustrated in FIG. 7A, the controller may command power regulation circuit 720A to refrain from regulating electrical current to yaw control propulsor 707B. In response to receiving the command to refrain from regulating the electrical current, power regulation circuit 720A may close (or keep closed) isolation device 726E to bypass rectifier 722B and inverter 724B. In other words, as shown by the solid black line from generator 702A to propulsor 707A, current may flow from generator 702B to propulsor 707B via the fourth current path (e.g., bypassing the first power electronics circuit 721A and the second power electronics circuit 721B) such that propulsor 707B may receive unregulated AC electrical current from generator 702B. In other words, the frequency of the electrical current received by propulsor 707A may equal the frequency of the electrical current generated by generator 702A.

As illustrated in FIG. 7B, the controller may command power regulation circuit 720D to increase the electrical current to outer yaw control propulsors 707G and 707H. In response to receiving the command to increase electrical power to propulsors 707G and 707H, power regulation circuit 720D may open (or keep open) switches 726G and 726K. For instance, when switch 726G is open, electrical current may flow from the third generator 702C through the fifth current path that includes power electronics circuit 721G. The third rectifier 722G may receive AC electrical current generated by generator 702C and convert the electrical current to a DC electrical current. Inverter 724G may receive the DC electrical current from rectifier 722G and convert the DC electrical current back to a regulated AC electrical current. In this way, propulsor 707G may receive regulated AC electrical current. Similarly, electrical current may flow from generator 702D through the sixth current path that includes power electronics circuit 721H. The fourth rectifier 722H may receive AC electrical power generated by generator 702D and convert the electrical current to a DC electrical current when isolation device 726K is open. Inverter 724H may convert the DC electrical current generated by rectifier 722H back to a regulated AC electrical current. As a result, the fourth propulsor 707H may receive regulated AC electrical current.

In the example of FIG. 7, the regulated AC electrical current received by propulsor 707A may have a lower frequency than the AC electrical current generated by generator 702B, which may correspond to a lower motor speed and thus, fan speed, of propulsor 707A. Decreasing the speed of propulsor 707A may decrease the thrust provided or generated by propulsor 707A. Similarly, the propulsors 707G and 707H may receive AC electrical current with higher frequency than the AC electrical current generated by generators 702C and 702D, which may increase the motor speed and thus, fan speed, of propulsors 707G and 707H. Increasing the speed of propulsors 707G and 707H may increase the thrust provided by propulsors 707G and 707H. Decreasing the thrust provided by propulsor 707A and/or increasing the thrust provided by propulsors 707G and 707H may cause the aircraft to turn.

Figure 8A:
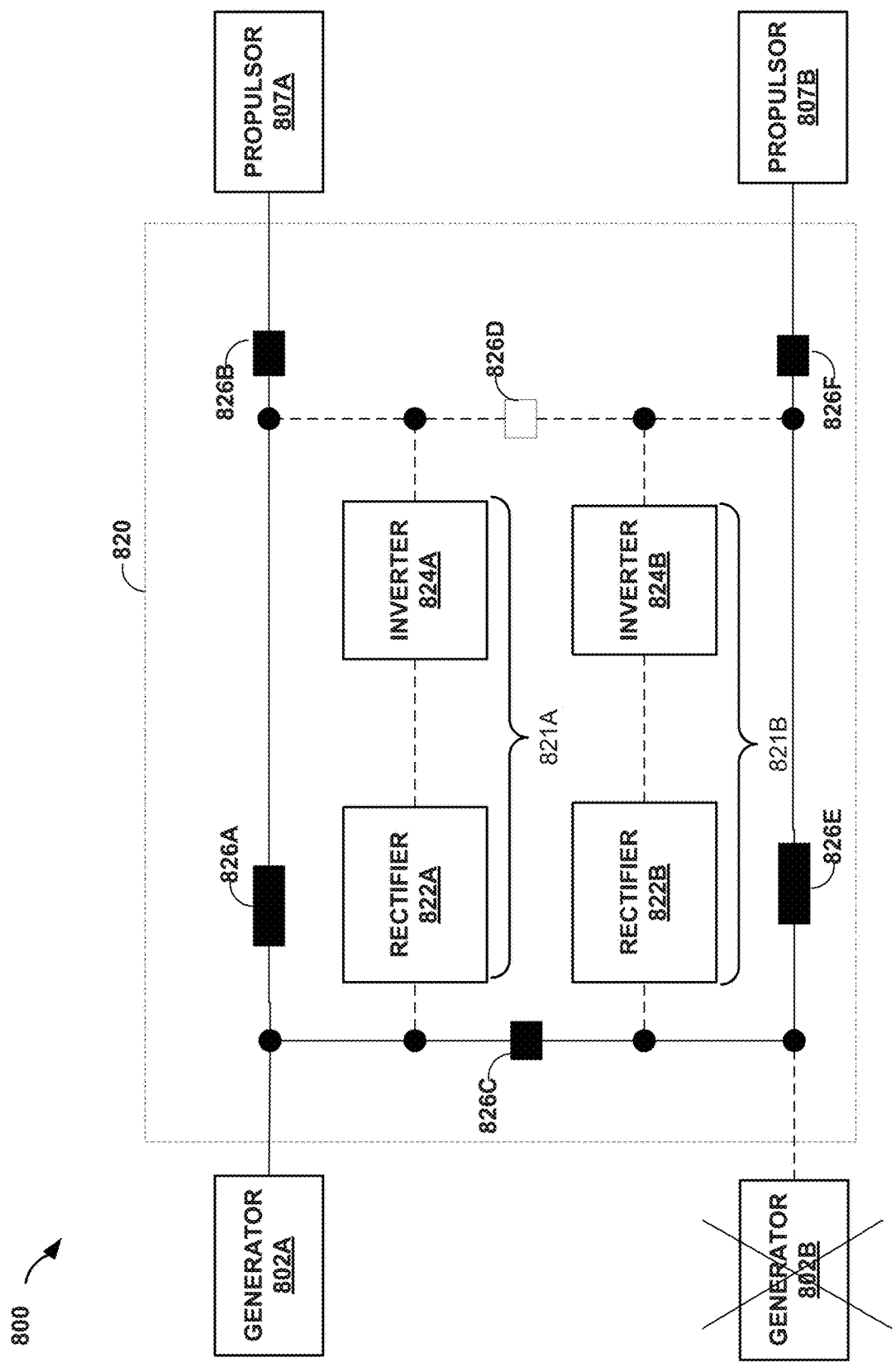
FIGS. 8A-8C are conceptual diagrams illustrating an example distributed propulsion system distributing electrical current when a generator has failed, in accordance with one or more aspects of the present disclosure.
Figure 8B:
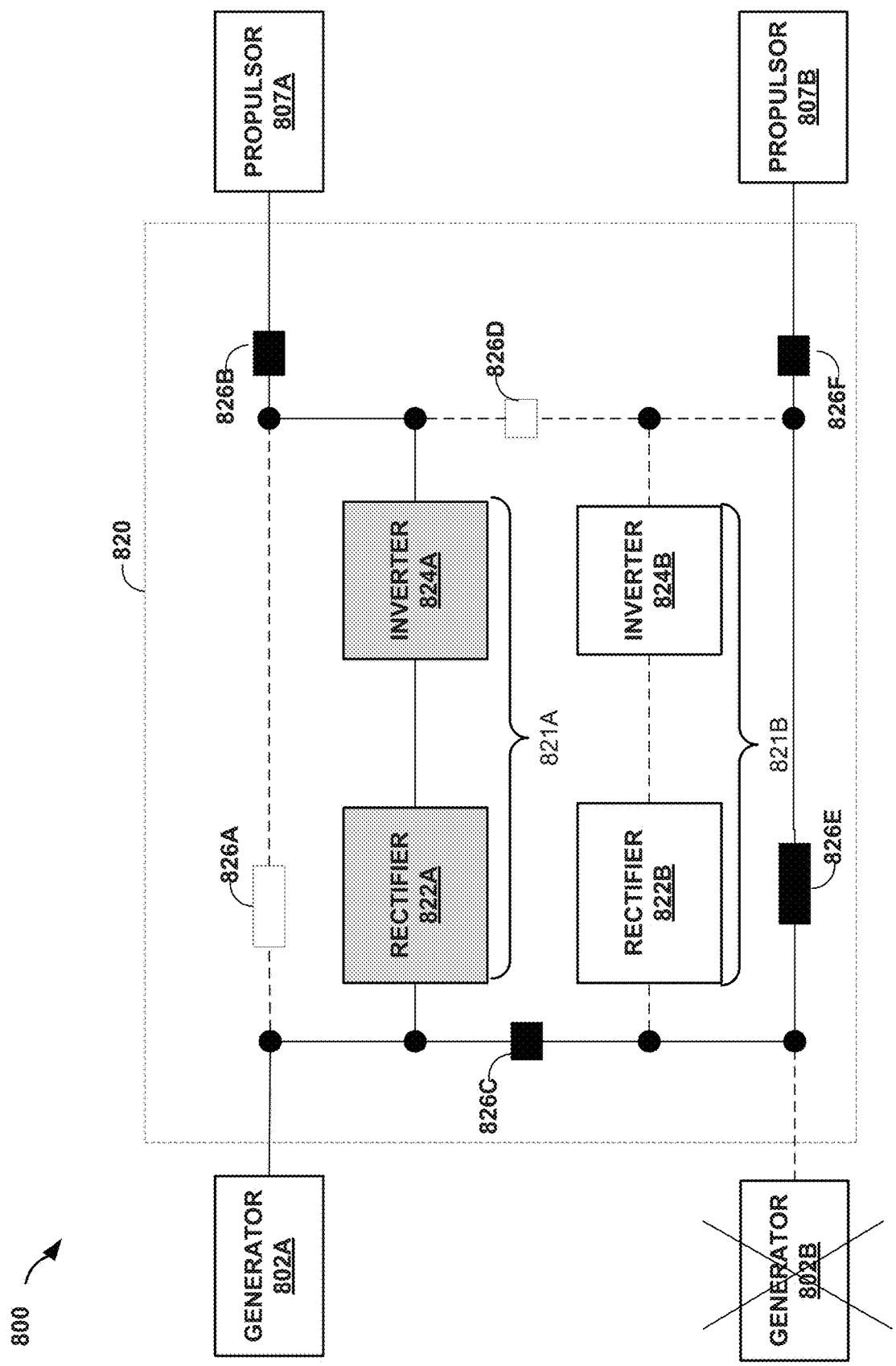
Figure 8C:
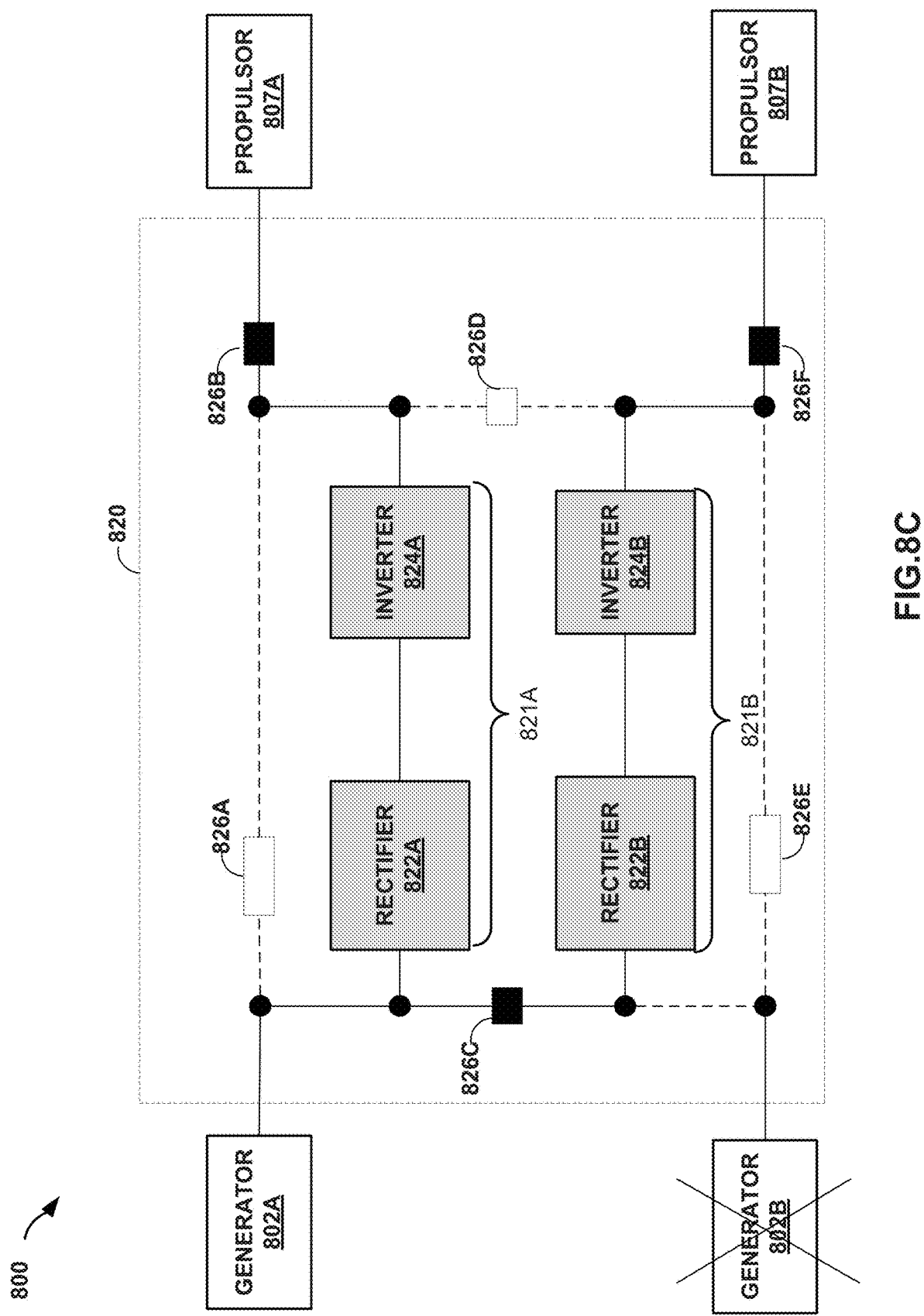

FIGS. 8A-8C are conceptual diagrams illustrating an example distributed propulsion system distributing electrical current when a generator has failed, in accordance with one or more aspects of the present disclosure. System 800 includes a plurality of generators 802A and 802B (collectively, "generators 802"), power regulation circuit 820, and yaw control propulsors 807A and 807B (collectively, "yaw control propulsors 807"). Generators 802 may be driven by the same engine or by different engines. While illustrated as including two generators 802, power regulation circuit 820, and two propulsors 807, system 800 may include additional generators 802, power regulation circuits 820, or propulsors 807 (e.g., as illustrated in FIG. 3).

Power regulation circuits 820 is coupled to a plurality of generators 802 via respective inputs and to a plurality of yaw control propulsors 807 via respective outputs. As illustrated in FIG. 8A, power regulation circuit 820 is coupled to a first generator 802A at a first input, to a first propulsor 807A at a first output, to a second generator 802B at a second input, and to a second propulsor 807B at a second output. Power regulation circuit 820 includes a plurality of current paths. For example, a first current path includes a first power electronics circuit 821A that includes a first rectifier 822A electrically coupled to a first inverter 824A. A second current path includes a second power electronics circuit 821B that includes a second rectifier 822B electrically coupled to a second inverter 824B. In the example of FIG. 8A, a third current path bypasses the first power electronics circuit 821A and the second power electronics circuit 821B (e.g., current may flow from the first input to the first output via switch 826A without flowing through a power electronics circuit). Likewise, a fourth current path bypasses the first power electronics circuit 521A and the second power electronics circuit 521B (e.g., current may flow from the first input to the second output via switches 826C and 826E or 826A and 826D). In some examples, power regulation circuit 820 may include more or fewer power electronics circuits. Further, power regulation circuit 820 may include fewer components and/or may include additional components not shown here.

The shading of first and second rectifiers 822A and 822B (collectively, "rectifiers 822") and inverters 824A and 824B (collectively, "inverters 824") indicates whether current is flowing to the rectifiers 822 and inverters 824. That is, shaded indicates that a rectifier of rectifiers 822 and a corresponding inverter of inverters 824 receives current, and hence regulates AC electrical current from a generator of generators 802, and white or unshaded indicates that a rectifier of rectifiers 822 and a corresponding inverter of inverters 824 does not receive current, and hence does not regulate AC electrical current from a generator of generators 802.

Power regulation circuit 820 also includes a plurality of switches 826A-826F (collectively, "switches 826"). Switches 826 represent switches that are selectively controllable (e.g., by controller 112 of FIG. 1 or control circuitry of power regulation circuit 820) for isolating the various components of system 800 from generators 802. That is, switches 826 are configurable for blocking voltages, interrupting currents and isolating conductors (e.g., physical or solid state interrupters) at the various components of system 800 that receive electrical current from generators 802. Switches 526 may include relays, switches, circuit breakers, or other devices for selectively coupling and decoupling various components of system 800. The shading of switches 826 in FIG. 8 indicates whether that isolation device 826 is opened or closed. That is, shaded indicates that a switch of switches 826 is closed, and white indicates that a the switch of switches 826 is open. When closed, the switch 826 transmits current, whereas that switch does not transmit when that switch is open.

In accordance with techniques of this disclosure, as illustrated in FIG. 8A, a power regulation circuit may distribute current from a single generator to multiple yaw control propulsors. In some examples, power regulation circuit 820 is configured to distribute current from a single generator (e.g., generator 802A) to multiple yaw control propulsors (e.g., 807A and 807B). For example, a controller (e.g., controller 112 of FIG. 1 or control circuitry of power regulation circuit 820) may determine that power regulation circuit 820 is no longer receiving power from a particular generator. For instance, the controller may determine that power regulation circuit 820 is no longer receive current from generator 802B in response to detecting a bus failure, generator failure, and/or engine failure. In other words, the controller may be configured to determine whether a fault condition exists in generators 802B or connecting equipment that connects one or more components of an electric propulsion system to one or more other components of the electric propulsion system. In response to determining that the fault condition is present, the controller may control one or more switches 826 to couple the generator 802A to propulsor 807B via one of the current paths. For instance, the controller may command power regulation circuit 820 to distribute current from generator 802A to propulsor 807B in response to determining that power regulation circuit 820 is no longer receiving current from generator 802A. The controller may command power regulation circuit 820 to close switch 826C (or switch 826D), thus enabling current to flow from the first generator 802A to the second propulsor 807B along the fourth current path.

Power regulation circuit 820 may selectively regulate current to one or more yaw control propulsors in response to receiving current from the single generator 802A. For example, the controller may command power regulation circuit 820 to refrain from regulating the electrical current distributed to propulsors 807A and 807B. As illustrated in FIG. 8A, power regulation circuit 820 may refrain from regulating the current to propulsor 807A by closing switch 826A such that current from generator 802A bypasses power electronics circuits 821. Similarly, power regulation circuit 820 may refrain from regulating the current to propulsor 807A by closing switches 826C and 826E such that current from the first generator 802A bypasses power electronics circuit 821.

As illustrated in FIG. 8B, power regulation circuit 820 may regulate the current to propulsor 807A and may refrain from regulating the current to propulsor 807B. For instance, power regulation circuit 820 may regulate the electrical current distributed to propulsor 807A by opening switch 826A. By opening switch 826A, current from generator 802A may flow along the first current path through power electronics circuit 821A. Thus, power electronics circuit 821A may regulate the frequency of the AC electrical current distributed to propulsor 807A in order to change the speed of the motor of propulsor 807A and the thrust generated by propulsor 807A. Power regulation circuit 820 may refrain from regulating the current to propulsor 807A by closing switches 826C and 826E such that current from generator 802A bypasses power electronics circuits 821. By bypassing power electronics circuit 821, power regulation circuit 820 may distribute unregulated electrical current to propulsor 807B. In other words, the frequency of the AC electrical current received by propulsor 807B may be the same as the frequency of the AC electrical current generated by the first generator 802A.

As illustrated in FIG. 8C, power regulation circuit 820 may regulate the current to propulsor 807A and propulsor 807B. For instance, power regulation circuit 820 may regulate the electrical current distributed to propulsor 807A by opening switch 826A. By opening switch 826A, current from generator 802A may flow through the first power electronics circuit 821A. Thus, the first power electronics circuit 821A may regulate the frequency of the AC electrical current distributed to the first yaw control propulsor 807A in order to change the speed of the motor of propulsor 807A and the thrust generated by propulsor 807A.

Likewise, power regulation circuit 820 may regulate the electrical current distributed to the second yaw control propulsor 807B by opening switch 826E to enable current from generator 802A to flow through the second power electronics circuit 821B. In the example of FIG. 8C, the second power electronics circuit 821B regulates the frequency of the AC electrical current distributed to propulsor 807B. The frequency of AC electrical current distributed to the first yaw control propulsor 807A may be the same as, or different from, the frequency of the AC electrical current distributed to the second yaw control propulsor 807B.

Figure 9A:
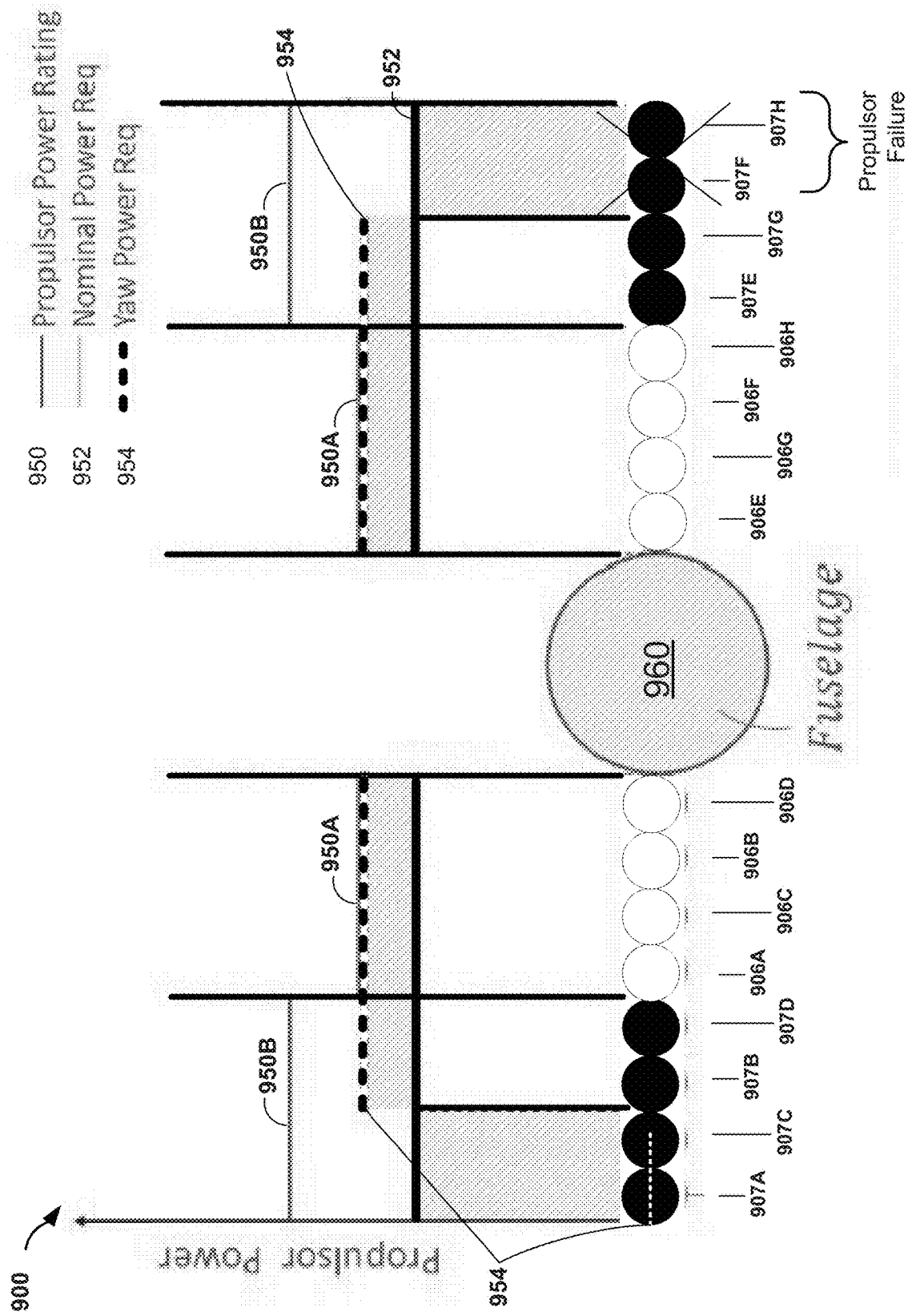
FIGS. 9A and 9B are conceptual diagrams illustrating an example distributed propulsion system in yaw accommodation and control modes, respectively, when one or more yaw control propulsors have failed, in accordance with one or more aspects of the present disclosure.
Figure 9B:
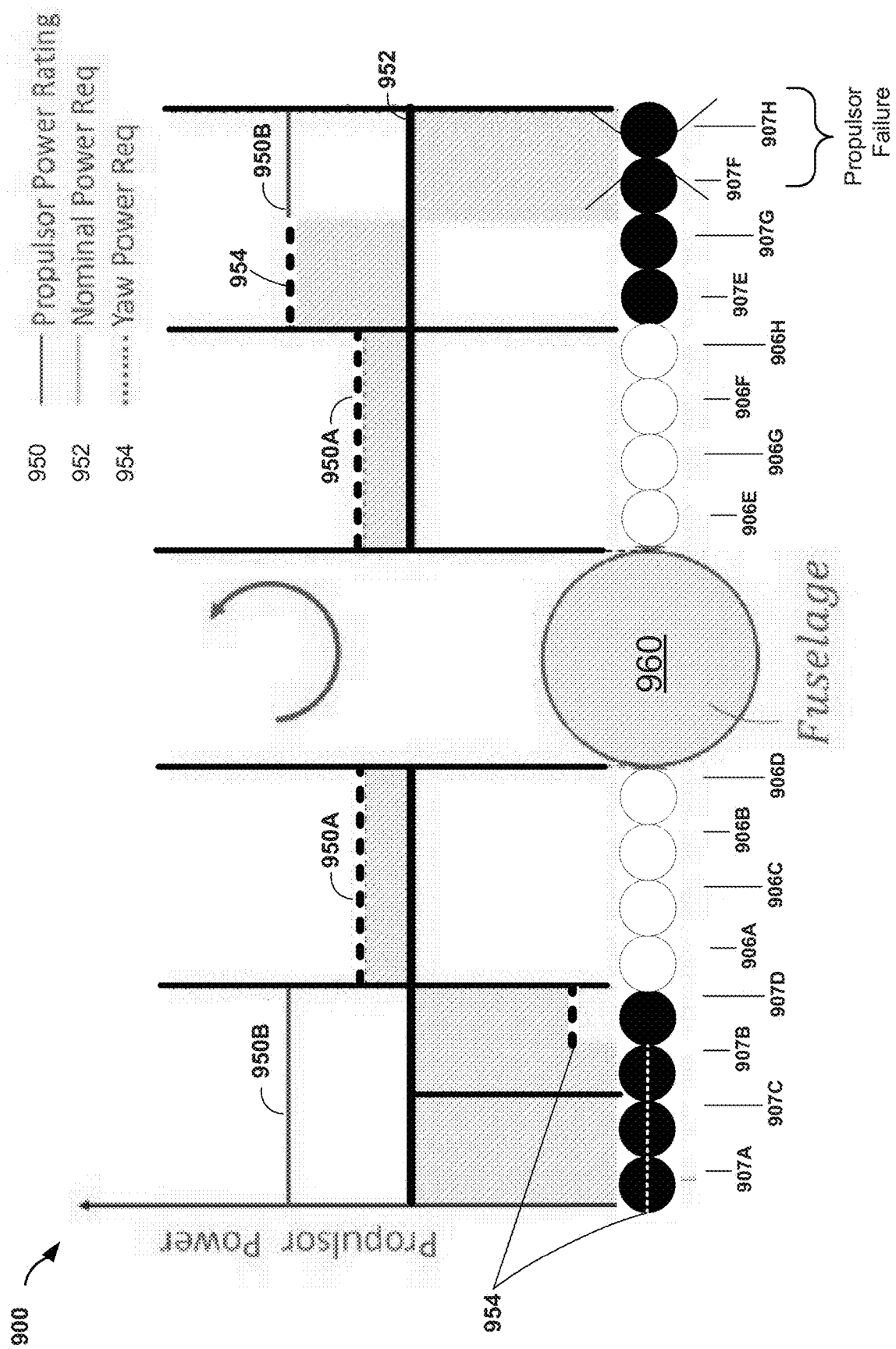

FIGS. 9A-9B are conceptual diagrams illustrating an example distributed propulsion system in yaw accommodation and control modes, respectively, when one or more yaw control propulsors have failed, in accordance with one or more aspects of the present disclosure. FIGS. 9A-9B are described in the context of system 100, 300, and 700 of FIGS. 1, 3, and 7, respectively.

Aircraft 900 includes fuselage 960, a plurality of thrust control propulsors 906A-906H (collectively, "thrust control propulsors 906"), and a plurality of yaw control propulsors 907A-907H (collectively, "yaw control propulsors 907"). Thrust control propulsors 906 may be rated to a first power rating 950A and yaw control propulsors 907 may be rated to a second power rating 950B. Power ratings 950A and 950B (collectively, "power ratings 950") may be the same, or may be different.

In some examples, a controller (e.g., controller 112 of FIG. 1 or control circuitry of a power regulation circuit) may detect that one or more yaw control propulsors 907 located on a particular side of fuselage 960 have failed or are otherwise not operational. For instance, as illustrated in FIG. 9A, the controller may detect that the two outermost yaw control propulsors 907F and 907H on one side of fuselage 960 are not operational.

In response to determining the two outermost yaw control propulsors 907F and 907H are not operational, the controller aircraft 900 may adjust (e.g., increase or decrease) the power consumed by, and hence the thrust generated by thrust control propulsors 906. For example, as illustrated in FIG. 9A, the controller may increase the power consumed by (and hence the thrust generated by) the thrust control propulsors 906 up to a maximum power rating 950A. Aircraft 900 may increase the thrust generated by thrust control propulsors 906 by increasing the speed of the generators (e.g., generators 702 of FIG. 7), thus increasing the frequency of the AC electrical current distributed to thrust control propulsors 906.

In some examples, the controller may selectively regulate the AC electrical current provided to one or more yaw control propulsors 907. For instance, the controller may regulate the AC current provided to one or more of yaw control propulsors 907 at a first time and refrain from regulating the AC current provided to one or more of yaw control propulsors 907 at a second time. As another example, the controller may regulate the AC current provided to a first yaw control propulsor of propulsors 907 and may refrain from regulating the AC current provided to a second yaw control propulsor of propulsors 907.

As illustrated in FIG. 9A, the controller may regulate the AC current distributed to the two outermost yaw control propulsors 907A and 907C (e.g., located on the side of fuselage 960 opposite the side that includes the failed yaw control propulsors 907F and 907H) in response to determining the two outermost yaw control propulsors 907F and 907H are not operational. In other words, the controller may regulate the AC current to one or more yaw control propulsors 907 to provide yaw accommodation in the event of a yaw propulsor failure. For example, the controller may regulate the AC current distributed to yaw control propulsors 907A and 907C to reduce the thrust generated by yaw control propulsors 907A and 907C by utilizing one or more power regulation circuits (e.g., power regulation circuit 720A of FIG. 7). For instance, the controller may decrease the power consumed by (and thrust generated by) yaw control propulsors 907A and 907C from the nominal power level 952 to a lower threshold power level by commanding the power regulation circuit to decrease the frequency of the AC electrical power distributed to yaw control propulsors 907A and 907C. The lower threshold power level may be zero (or approximately zero) Watts, or some other power level such that propulsors 907A and 907C provide negligible thrust. In some examples, the controller may decrease the power consumed by yaw control propulsors 907A and 907C by reducing the speed of propulsors 907A and 907C to a lower threshold rotational speed (e.g., zero radians per second or other rotational speed such that yaw control propulsors 907A and 907C provide negligible thrust) in response to determining the two outermost yaw control propulsors 907F and 907H are not operational. The controller may reduce the rotational speed and thrust generated by yaw control propulsors 907A and 907C by commanding one or more power regulation circuits to reduce the frequency of the electrical current distributed to propulsors 907A and 907C.

As illustrated in FIG. 9A, the controller may refrain from regulating the AC current distributed to the interior yaw control propulsors 907B, 907D, 907E, and 907G. An interior yaw control propulsor is a yaw control propulsor that is closer to the fuselage 960 than some other yaw control propulsor. For example, the controller may command one or more power regulation circuits (e.g., power regulation circuits 720 of FIG. 7) to close one or more switches such that the current flows via a current path that bypasses the power electronics circuits. In these examples, by refraining from regulating the AC current to yaw control propulsors 907B, 907D, 907E, and 907G, the frequency of the AC electrical current distributed to interior yaw control propulsors 907B, 907D, 907E, and 907G may equal the frequency of the AC electrical current generated by the generators and distributed to the thrust control propulsors 906.

As illustrated in FIG. 9B, in some examples, the controller may control the yaw of the aircraft 900 by adjusting the thrust generated by one or more of yaw control propulsors 907. In other words, the controller may adjust thrust generated by one or more yaw control propulsors 907 to provide yaw accommodation and control in the event of a yaw propulsor failure. For instance, aircraft 900 may adjust the thrust generated by one or more yaw control propulsors in response to receiving a command to turn aircraft 900. Aircraft 900 may adjust the thrust generated by the yaw control propulsors by increasing thrust generated by a first group of yaw control propulsors, decreasing thrust generated a second group of yaw control propulsors, or both. For example, as illustrated in FIG. 9B, aircraft 900 may decrease the thrust generated by yaw control propulsors 907B and 907D and may increase the thrust generated by yaw control propulsors 907E and 907G.

The controller of aircraft 900 may adjust the thrust generated by the yaw control propulsors by regulating the AC electrical current distributed to the yaw control propulsors. For example, the controller may adjust the thrust generated by a given yaw control propulsor 907 by adjusting the speed of a propulsor motor, and may adjust the speed of the propulsor motor by adjusting the frequency of the AC electrical current provided to the respective propulsor motor of one or more yaw control propulsors 907.

The controller may reduce the thrust generated by yaw control propulsors 907B and 907D by reducing (via one or more of power electronics circuits 720 of FIG. 7) the frequency of the AC electrical current provided to the respective yaw control propulsors. The controller may reduce the thrust generated by yaw control propulsors 907B and 907D equally or unequally (e.g., one at a time). In the example of FIG. 9B, the controller may reduce the thrust generated by yaw control propulsor 907B and 907D unequally by first reducing the power consumed by yaw control propulsor 907B from a first power level to the lower threshold power level (e.g., by reducing the rotational speed of yaw control propulsors 907B from a first speed to be less than or equal to a lower threshold speed), and then reducing the power consumed by, and hence thrust generated by, yaw control propulsor 907D. In some instances, the controller may first reduce the power consumed by yaw control propulsor 907B to the lower threshold power level to obtain a larger thrust differential between a first (e.g., left) side of aircraft 900 and a second (e.g., right) side of aircraft 900. In some instances, the controller may reduce the power consumed by, and hence thrust generated by, the next outermost yaw control propulsors 907D in response to reducing the power consumed by yaw control propulsor 907B to the lower threshold power level (or reducing the rotational speed to the lower threshold speed). For instance, as illustrated by FIG. 9, the controller may reduce the power consumed by (and thrust generated by) propulsor 907D from the nominal power level 952 to another, lower power level while controlling yaw.

In some examples, the controller may regulate the AC electrical current distributed to one or more yaw control propulsors in order to increase the thrust generated by the one or more yaw control propulsors. For instance, the controller may increase the frequency of the AC electrical current provided to the respective propulsor motors of propulsors 907E and 907G to increase the speed of a propulsor motor, and hence the thrust of the respective propulsor motors. The controller may increase the thrust generated by yaw control propulsors 907E and 907G equally or unequally. In one scenario, the controller increases the thrust generated by propulsors 907E and 907G one at a time (e.g., starting with the outermost of propulsor 907E and 907G, which is propulsor 907G in FIG. 9B), which may increase the thrust differential between the first and second sides of aircraft 900. In another scenario, as illustrated in FIG. 9, the controller increases the thrust generated by propulsors 907E and 907G equally.

Figure 10A:
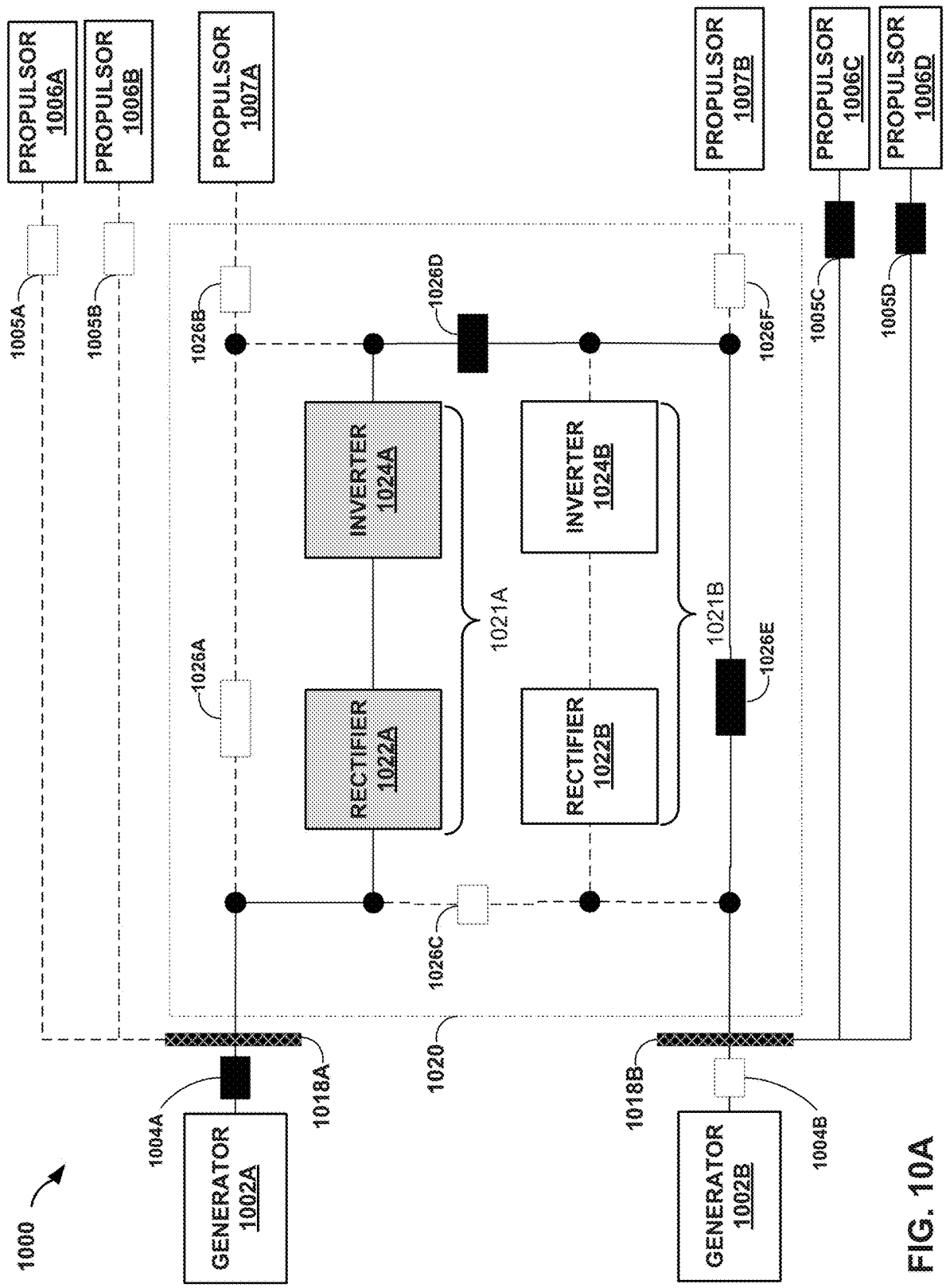
FIGS. 10A-10C are conceptual diagrams illustrating an example distributed propulsion system that synchronizes a propulsor to a generator, in accordance with one or more aspects of the present disclosure.
Figure 10B:
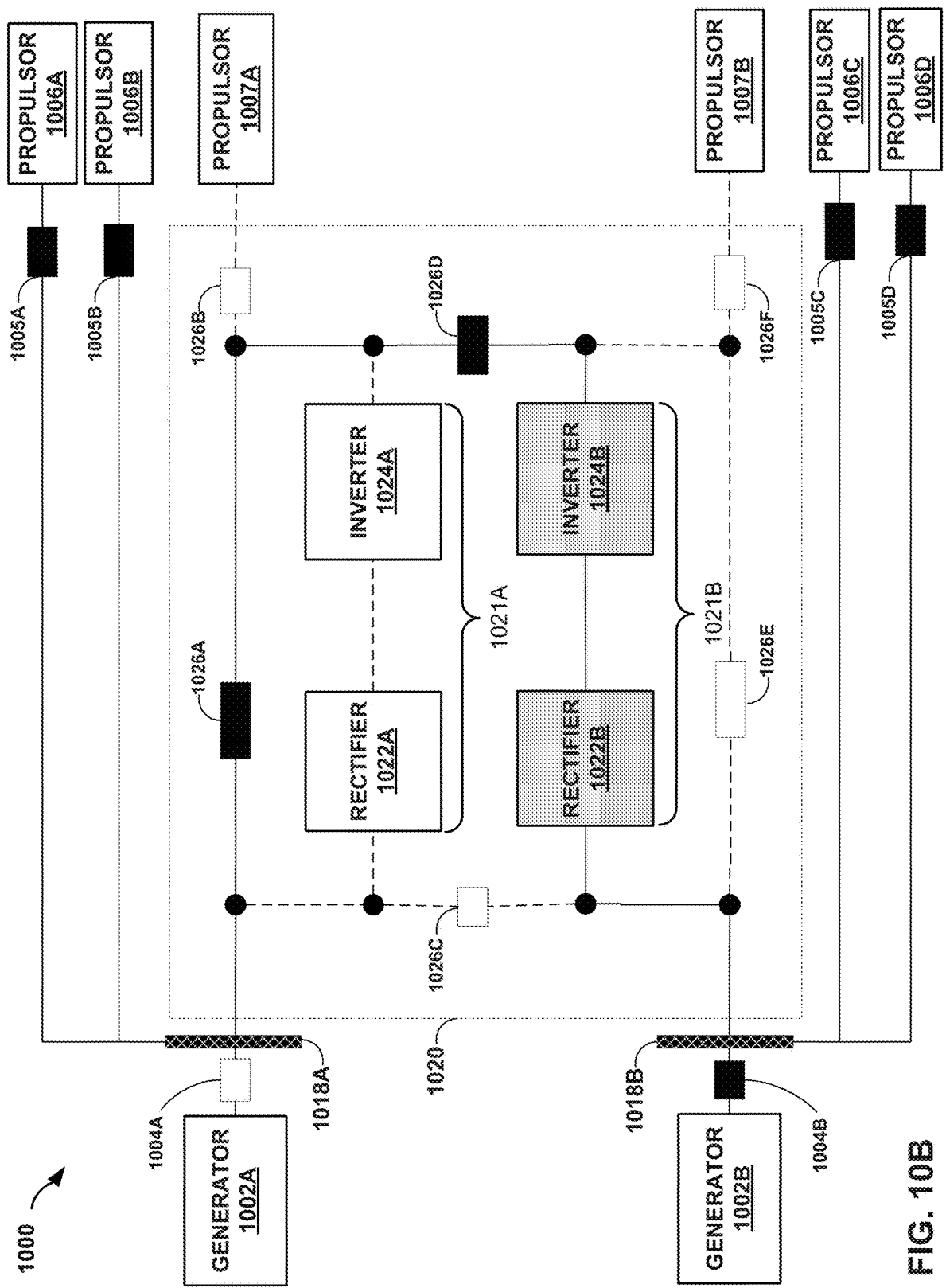
Figure 10C:
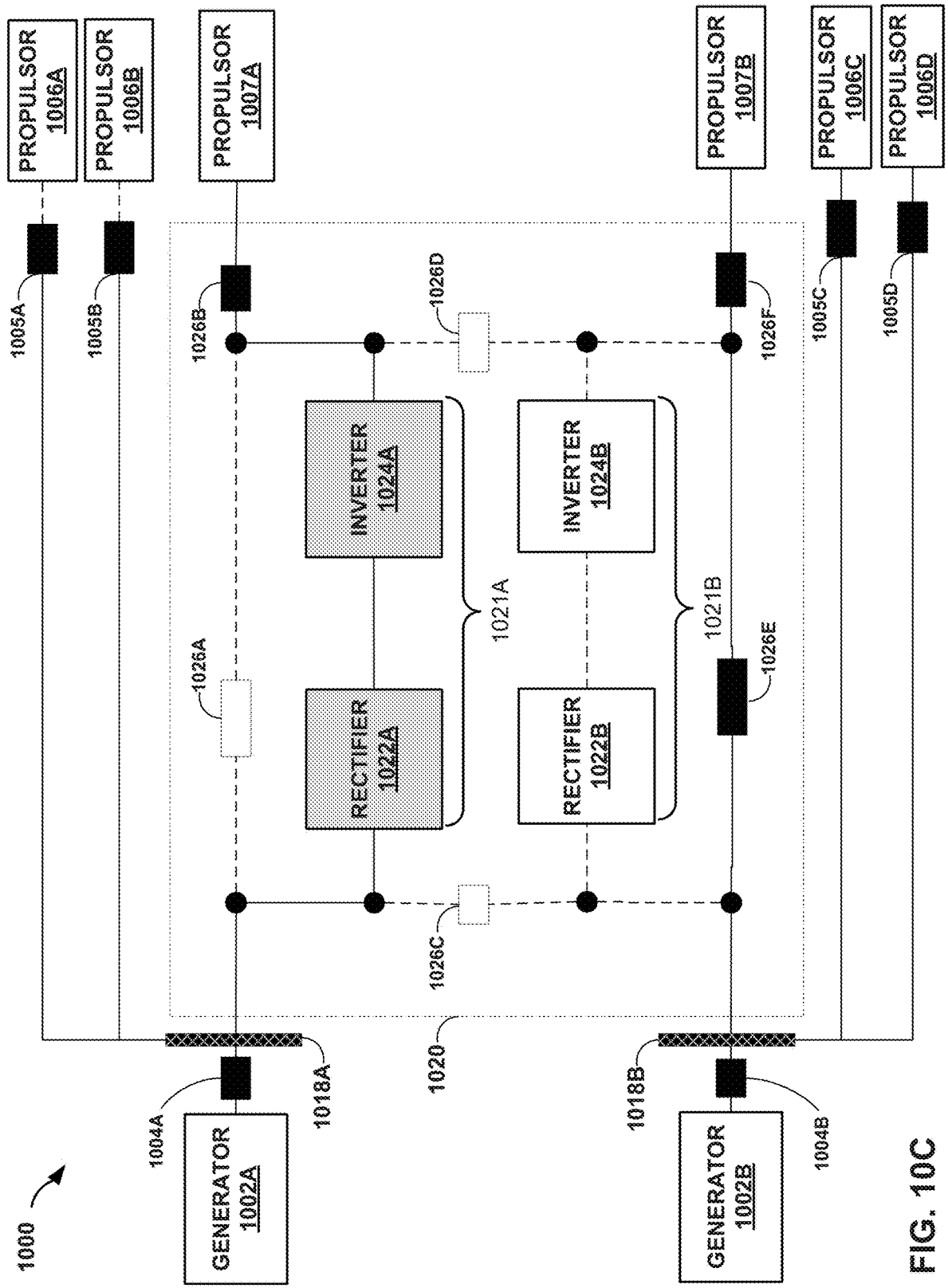

FIGS. 10A-10C are conceptual diagrams illustrating an example distributed propulsion system that synchronizes a propulsor to a generator, in accordance with one or more aspects of the present disclosure. Distributed propulsion system 1000 is described below in the context of system 100 of FIG. 1.

System 1000 includes a plurality of generators 1002A and 1002B (collectively, generators 1002), bus switches 1004A and 1004B (collectively, bus switches 1004), propulsor switches 1005A-1005D (collectively, propulsor switches 1005, a plurality of thrust control propulsors 1006A-1006D (collectively, "thrust control propulsors 1006"), a plurality of yaw control propulsors 1007A and 1007B (collectively, "yaw control propulsors 1007"), busses 1018A and 1018B (collectively, "busses 1018"), and a power regulation circuit 1020.

Bus switches 1004 and propulsor switches 1005 represent switches that are selectively controllable (e.g., by controller 112) for isolating the various components of system 1000 from other components. In other words, switches 1004 and 1005 are configurable for blocking voltages, interrupting currents and isolating conductors (e.g., physical or solid state interrupters) at the various components of system 1000. The shading of switches 1004 and 1005 in FIG. 10 indicates whether that switch is opened or closed. That is, dark or shaded indicates that an switch is closed, and white or unshaded indicates that a switch is open. When a particular switch is closed, the particular switch transmits current, whereas the particular switch does not transmit current when that particular switch is open.

Power regulation circuit 1020 may be selectively electrically coupled to a first generator 1020A via a first input and to a second generator 1020B via a second input. Power regulation circuit 1020 may be selectively electrically coupled to a first yaw control propulsor 507A via a first output, and to a second yaw control propulsor 507B via a second output. For instance, the controller may couple power regulation circuit 1020 by closing bus switch 1004A and be decouple power regulation circuit 1020 from the second generator 1002B by opening bus contact 1004B.

Power regulation circuit 1020 includes a plurality of current paths. In some examples, a first current path includes a first power electronics circuit 1021A that includes a first rectifier 1022A electrically coupled to a first inverter 1024A. In some examples, a second current path includes a second power electronics circuit 1021B that includes a second rectifier 1022B electrically coupled to a second inverter 1024B. Power regulation circuit 1020 also includes a plurality of power regulation switches 1026A-1026F (collectively, "power regulation switches 1026"), which may be similar to bus switches 1004 and propulsor switches 1005.

The shading of rectifiers 1022 and inverters 1024 indicates whether current is flowing to the rectifiers 1022 and inverters 1024. That is, shaded indicates that a rectifier of rectifiers 1022 and an inverter of inverters 1024 receives current, and hence regulates AC electrical current from a generator of generators 1002, and white (e.g., not shaded) indicates that a rectifier of rectifiers 1022 and an inverter of inverters 1024 does not receive current, and hence does not regulate AC electrical current from a generator of generators 1002.

Power regulation circuit 1020 includes a third current path that bypasses first power electronics circuit 1021A and second power electronics circuit 1021B. For example, the third current path may include at least one power regulation switch of power regulation switches 1026. For instance, the third current path may include power regulation switch 1026A such that, when power regulation switch 1026A is closed, current may flow directly between the first input to the first output. Power regulation circuit 1020 also includes a fourth current path that bypasses first power electronics circuit 1021A and second power electronics circuit 1021B. For example, the fourth current path may include one or more power regulation switches of power regulation switches 1026. For instance, the fourth current path may include power regulation switch 1026E, such that, when power regulation switch 1026E is closed, current may flow directly between the second input and the second output. In some examples, power regulation circuit 1020 may include more or fewer power electronics circuits and/or more of fewer switches 1004, 1005, and 1026. Further, power regulation circuit 1020 may include additional components not shown here.

The controller may selectively couple power regulation circuit 1020 to one or more yaw control propulsors 1007. For instance, the controller may couple and decouple power regulation circuit 1020 to or from propulsor 1007A by respectively closing and opening power regulation switch 1026B. Similarly, the controller may couple power regulation circuit 1020 to propulsor 1007B by closing switch 1026E and decouple power regulation circuit 1020 to propulsor 1007B by opening switch 1026E.

In some scenarios, thrust control propulsors 1006 receive unregulated electrical current directly from a particular generator via a bus 1018 to which the respective propulsor is electrically coupled. Similarly, in some scenarios, power regulation circuit 1020 selectively regulates electrical current to yaw control propulsors 1007.

In accordance with techniques of this disclosure, a power regulation circuit 1020 may be utilized to synchronize one or more thrust control propulsors 1006 to a generator. For instance, power regulation circuit 1020 may synchronize one or more of thrust control propulsors 1006 upon system startup, or while the system is already running (e.g., if a thrust control propulsor becomes unsynchronized with a particular generator during flight). In some examples, power regulation circuit 1020 may receive AC electrical current from a particular generator via a first bus, regulate the electrical current received from that particular generator, and distribute the regulated AC electrical current to one or more of thrust control propulsors 1006 via a second bus. For example, FIG. 10A illustrates a scenario where power regulation circuit 1020 receives AC electrical current from generator 1002A via bus 1018A, regulates the AC electrical current, and distributes the regulated AC electrical current to thrust control propulsors 1006C and 1006D via a second bus 1018B.

As illustrated in FIG. 10A, bus switch 1018A is closed and couples electrical bus 1018A to generator 1002A. Because bus switch 1004B is open, generator 1002B is electrically decoupled or isolated from bus 1018B. Rectifier 1022A receives the AC electrical current from generator 1002A and converts the received electrical current to DC electrical current. Inverter 1024A converts the DC electrical current back to a regulated AC electrical current. In other words, AC electrical current may flow from generator 1002A to the first input of power regulation circuit 1020 and along the first current path (which includes power electronics circuit 1021A). Because power regulation switches 1026D and 1026E are closed, power regulation circuit 1020 distributes the regulated AC electrical current to bus 1018B. In other words, the controller couples the first current path and the fourth current path (which includes power regulation switch 1026E) by closing power regulation switch 1026D. By closing power regulation switch 1026E, the regulated AC current may flow from power electronics circuit 1021A to the second electrical bus 1018B via the fourth current path. Thrust control propulsors 1006C and 1006D receive the regulated AC electrical current via bus 1018B. Rectifier 1022A and inverter 1024A of power regulation circuit 1020 may adjust the regulated AC electrical current to synchronize thrust control propulsors 1006C and 1006D with generator 1002B.

In the example of FIG. 10A, power regulation switches 1026B and 1026F are open, such that yaw control propulsors 1007A and 1007B do not receive electrical current. Similarly, propulsor switches 1005A and 1005B are open, such that thrust control propulsors 1006A and 1006B do not receive electrical current. In the example of FIG. 10A, only the thrust control propulsors 1006C and 1006D that are typically powered with unregulated electrical current received from generator 1002B receive electrical current. In this way, power regulation circuit 1020 may synchronize thrust control propulsors 1006C and 1006D to generator 1002B.

In response to synchronizing thrust control propulsors 1006C and 1006D to generator 1002B, system 1000 may synchronize thrust control propulsors 1006A and 1006B to generator 1002A. For example, FIG. 10B illustrates a scenario where power regulation circuit 1020 receives AC electrical current from generator 1002B via bus 1018B, regulates the AC electrical current, and distributes the regulated AC electrical current to thrust control propulsors 1006A and 1006B via bus 1018A.

As illustrated in FIG. 10B, bus switch 1004A is open such that generator 1002A is electrically decoupled or disconnected from bus 1018A, and bus switch 1018B is closed such that electrical bus 1018B is electrically coupled or connected to generator 1002B. In the example of FIG. 10B, rectifier 1022B receives AC electrical current from generator 1002B and converts the received electrical current to DC electrical current. Inverter 1024B converts the DC electrical current back to a regulated AC electrical current. In other words, AC electrical current flow from generator 1002B to the second input of power regulation circuit 1020 and along the second current path (which includes power electronics circuit 1021B). Because power regulation switches 1026D and 1026A are closed, power regulation circuit 1020 distributes the regulated AC electrical current to bus 1018A. In other words, the controller couples the second current path and the third current path (which includes power regulation switch 1026A) by closing power regulation switch 1026D. By closing power regulation switch 1026E, the regulated AC current may flow from power electronics circuit 1021B to the first electrical bus 1018A via the third current path. Thrust control propulsors 1006A and 1006B receive the regulated AC electrical current via bus 1018A. Rectifier 1022B and inverter 1024B of power regulation circuit 1020 may adjust the regulated AC electrical current to synchronize thrust control propulsors 1006A and 1006B with generator 1002A.

In the example of FIG. 10B, propulsor switches 1005C and 1005D remain closed, such that thrust control propulsors 1006C and 1006D may remain synchronized to generator 1002B. In this way, power regulation circuit 1020 may synchronize thrust control propulsors 1006A and 1006B to generator 1002A while maintaining synchronization between generator 1002B and thrust control propulsors 1006C, 1006D.

As illustrated in FIG. 10C, in response to synchronizing generator 1002A to thrust control propulsors 1006A, 1006B and synchronizing generator 1002B to thrust control propulsors 1006C, 1006D, power regulation circuit 1020 may selectively regulate electrical current to one or more of yaw control propulsors 1007. For instance, power regulation circuit 1020 may open switch 1026D, such that electrical current from generator 1002A is distributed to yaw control propulsor 1007A and electrical current from generator 1002B is distributed to yaw control propulsor 1007B. In the example illustrated in FIG. 10C, power regulation circuit 1020 regulates electrical current from generator 1002A and distributes the regulated electrical current to propulsor 1007A. For instance, current from the first generator 1002A flows along the first current path, which includes power electronics circuit 1021A, to yaw control propulsor 1007A. As further illustrated in FIG. 10C, power regulation circuit 1020 refrains from regulating electrical current to yaw control propulsor 1007B. For instance, power regulation switch 1026E is closed, such that current from generator 1002B bypasses the power electronics rectifier 1022B and inverter 1024B. In other words, current from second generator 1002B flows along the fourth current path, which includes switch 1026E, to yaw control propulsor 1007B without flowing through either of power electronics circuits 1021A or 1021B. In this way, propulsor 1007B may receive unregulated AC electrical current from generator 1002B. In some examples, power regulation circuit 1020 may regulate electrical current to either, both, or neither of yaw control propulsors 1007A after synchronizing the thrust control propulsors 1006 to the respective generators 1002.

Figure 11:
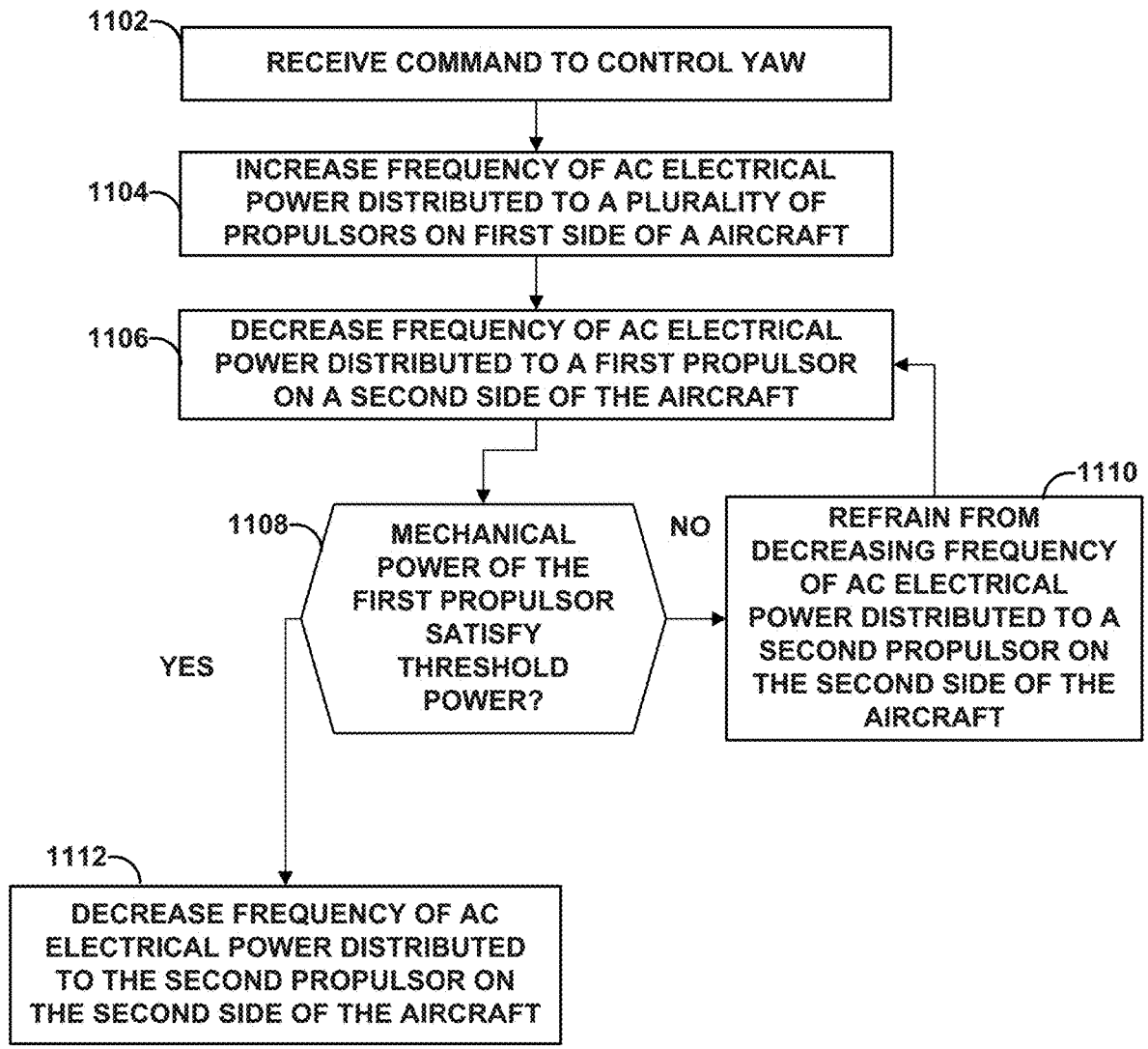
FIG. 11 is a flow chart illustrating example operations performed by an example current regulation circuit to selectively regulate electrical current to one or more propulsors to control yaw, in accordance with one or more aspects of the present disclosure.

FIG. 11 is a flow chart illustrating example operations performed by an example power regulation circuit configured to selectively regulate current to one or more propulsors to control yaw, in accordance with one or more aspects of the present disclosure. FIG. 11 is described in the context of system 100 and 300 of FIGS. 1 and 3, respectively. While described generally with respect to an aircraft, the example operations described in FIG. 11 may also apply to other vessels (e.g., marine craft) that rely on distributed propulsion systems.

A controller (e.g., controller 112 of FIG. 1) may receive a command to control the yaw of an aircraft (1102). For example, the controller may receive a command to turn the aircraft (or marine craft). In response to receiving the command to control the yaw, the controller may command one or more of power regulation circuits 320 to adjust the frequency of the AC electrical current distributed to one or more of yaw control propulsors 307, which may adjust the motor speed of the respective yaw control propulsors 307 and hence the thrust generated by the respective yaw control propulsors 307. In other words, by adjusting the frequency of the AC electrical current distributed to yaw control propulsors 307, the controller may control the thrust provided by the yaw control propulsors 307 and thus control the yaw of the aircraft.

One or more power regulation circuit 320A-320D may regulate the electrical current distributed to one or more yaw control propulsors 307A-307H in response to receiving a command from the controller. For example, the controller may command a first group of power regulation circuits 320C and 320D, which are electrically coupled to a group of yaw control propulsors 307E-307H on a first side of the aircraft, to increase the frequency of the AC electrical current distributed to yaw control propulsors 307E-307H (1104). For instance, power regulation circuit 320C may control one or more switches to cause current to flow from AC generator 102A through a current path that includes a power electronics circuit, such that the power electronics circuit may regulate or adjust the frequency of the AC current provided to one or more yaw control propulsors. Increasing the frequency of the AC electrical current distributed to propulsors 307E-307H may increase the thrust generated by the respective yaw control propulsors on the first side of the aircraft.

In some examples, the controller may command one or more power regulation circuits 320A and 320B, which are electrically coupled to a group of yaw control propulsors 307A-307D on a second side of the aircraft, to decrease the frequency of the AC electrical current distributed to yaw control propulsors 307A-307D. For example, power regulation circuit 320A may decrease the frequency of the AC electrical current distributed to yaw control propulsor 307A (1106).

The controller may determine whether the power consumed by (and hence thrust generated by) the first propulsor 307A satisfies (e.g., is less than or equal to) a lower threshold power level or whether the rotational speed of the first propulsor 307A satisfies a threshold speed. In some examples, the lower threshold power level may be zero (or approximately zero) watts, or another power level such that the propulsor provides negligible thrust. Similarly, the lower threshold speed may be zero (or approximately zero) radians or another speed such that the propulsor provides negligible thrust. In response to determining that the power consumed by (and thrust generated by) the first propulsor 307A does not satisfy the threshold power level ("NO" branch of 1108) or that the speed does not satisfy the threshold speed, the controller may refrain from decreasing the frequency of the AC electrical current distributed to a second propulsor on the second side of the aircraft (1110). For instance, the controller may command power regulation circuit 320A to refrain from regulating the electrical current distributed to yaw control propulsor 307C and may command power regulation circuit 320B to refrain from regulating the AC electrical current distributed to propulsors 307B and 307D. For instance, the controller may configure the switches of power regulation circuits 320A and 320B to route current through a respective fourth current path such that the current flows from a respective generator to the respective yaw control propulsors without flowing through a power electronics circuit. In other words, the frequency of the AC electrical current distributed to propulsors 307B-307D may equal the frequency of the AC electricity generated by the generators 302.

In response to determining that the power consumed by (and hence thrust generated by) the first propulsor 307A satisfies (e.g., is less than or equal to) the threshold power level ("YES" branch of 1108) or that the rotational speed of the first propulsor 307A satisfies a threshold speed, the controller may decrease the frequency of the AC electrical current distributed to a second propulsor on the second side of the aircraft (1110). For instance, the controller may command power regulation circuit 320A to decrease the frequency of the AC electrical current distributed to yaw control propulsor 307C. Additionally or alternatively, the controller may command regulation circuit 320B to decrease the frequency of the AC electrical current distributed to propulsor 307B and/or propulsor 307D.

Figure 12:
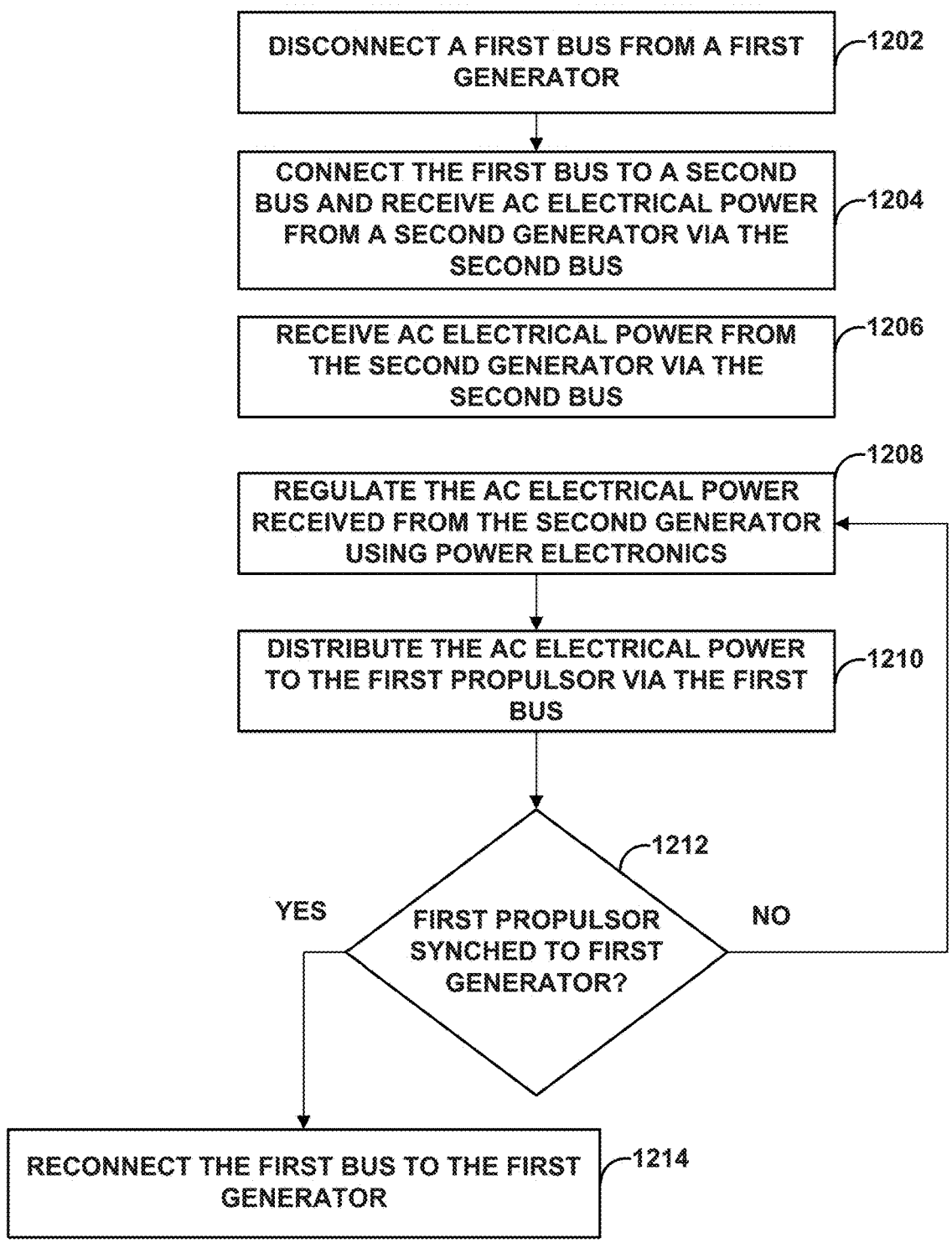
FIG. 12 is a flow chart illustrating example operations performed by a distributed propulsion system to synchronize one or more propulsors to a generator, in accordance with one or more aspects of the present disclosure.

FIG. 12 is a flow chart illustrating example operations performed by distributed propulsion system to synchronize one or more propulsors to a generator, in accordance with one or more aspects of the present disclosure. FIG. 12 is described in the context of system 100 and 1000 of FIGS. 1 and 10, respectively. While described generally with respect to an aircraft, the example operations described in FIG. 12 may also apply to other vessels (e.g., marine craft) that rely on distributed propulsion systems.

A controller (e.g., controller 112 of FIG. 1) may decouple or disconnect a first bus from a first generator (1202). For example, the controller may open switch 1004B to decouple electrical bus 1018B from generator 1002B. Power regulation circuit 1020 may couple the first electrical bus to a second electrical bus (1204). For instance, power regulation circuit 1020 may close switch 1026D to electrically couple electrical bus 1018A and electrical bus 1018B.

Power regulation circuit 1020 may receive AC electrical current from a second generator via the second bus (1204). For instance, power regulation circuit 1020 may receive AC electrical current from generator 1002A via electrical bus 1018A when switch 1018A is closed. In some examples, in response to receiving AC electrical current from the second generator, power regulation circuit 1020 may regulate the AC electrical current received from the second electrical bus using a power electronics circuit (1206). For example, as shown in FIG. 10A, power electronics circuit 1021A, which includes rectifier 1022A and inverter 1024A, may adjust the frequency of the AC electrical current from the frequency generated by generated 1002A to a different electrical frequency. In other words, the current from generator 1002A may flow along a first current path, which includes power electronics circuit 1021A, of power regulation circuit 1020.

Power regulation circuit 1020 may distribute the regulated AC electrical current to the first propulsor via the first electrical bus (1208). For instance, as illustrated in FIG. 10A, current may flow from power electronics circuit 1021A to electrical bus 1018B because switches 1026D and 1026E are closed. In other words, closing switch 1026D may couple the first current path to a fourth current path, which includes switch 1026E, such that regulated AC current may flow from the first power electronics circuit 1021A to the second electrical bus 1018B. In some examples, one or more yaw control propulsors (e.g., 1006C and/or 1006D) may be electrically coupled to electrical bus 1018B and receive regulated AC electrical current via electrical bus 1018B.

The controller may determine whether the first propulsor is synchronized with the first generator (1210). For example, the controller may receive information indicative of the rotational speed of the propulsor motors of propulsors 1006C and may compare to information indicative of the speed of the engine driving AC generator 1002B. In some instances, the controller may determine that propulsors 1006C and 1006D are synchronized to the generator 1002B if the rotational speed of propulsors 1006C and 1006D is equal or proportional to the rotational speed of the engine driving generator 1002B.

In response to determining that the first propulsor is not synchronized with the first generator ("NO" branch of 1210), the power regulation circuit may re-regulate the AC electrical current using the power electronics (1206). For example, power regulation circuit 1020 may further adjust the frequency of the AC electrical current distributed to propulsors 1006C and 1006D.

In response to determining that the first propulsor is synchronized with the first generator ("YES" branch of 1210), the controller may reconnect the first bus to the first generator (1216). For example, the controller may close switch 1004B to couple generator 1002B to electrical bus 1018B. Coupling electrical bus 1018B and generator 1002B may enable generator 1002B to drive propulsors 1006C and 1006D. In other words, once propulsors 1006C and 1006D are synchronized with generator 1002B, propulsors 1006C and 1006D may receive unregulated current directly from generator 1002B to provide thrust control for the aircraft.

Various examples have been described. These and other examples are within the scope of the following claims.

What is claimed is:

1. A distributed propulsion system, comprising:
   a first propulsor and a second propulsor;
   a first generator configured to generate a first AC current;
   a second generator configured to generate a second AC current; and
   a power regulation circuit electrically coupled to the first propulsor via a first output, the second propulsor via a second output, the first generator via a first input, and the second generator via a second input, wherein the power regulation circuit comprises:
      a first current path comprising a first power electronics circuit,
      a second current path comprising a second power electronics circuit,
      a third current path that bypasses the first and second power electronics circuits,
      a fourth current path that bypasses the first and second power electronics circuits, and
      a plurality of switches configured to selectively couple each respective input to a respective selected output to cause a respective current to flow from the respective input to the respective selected output via one of the first current path, the second current path, the third current path, or the fourth current path, the plurality of switches including a first switch and a second switch, and
   control circuitry configured to:
      cause the first AC current to flow through the first current path by at least opening the first switch;
      cause the second AC current to flow through the second current path by at least opening the second switch;
      cause the first AC current to flow through the third current path by at least closing the first switch; and
      cause the second AC current to flow through the fourth current path by at least closing the second switch.

2. The distributed propulsion system of claim 1, wherein the first power electronics circuit comprises a first rectifier electrically coupled to a first inverter, and wherein the second power electronics circuit comprises a second rectifier electrically coupled to a second inverter.

3. The distributed propulsion system of claim 1, wherein the control circuitry is configured to:
   open the first switch to cause the first AC current to flow through the first power electronics circuit of the first current path; and
   control the first power electronics circuit to reduce a frequency of the first AC current to cause rotation of the first propulsor to slow.

4. The distributed propulsion system of claim 3, wherein the control circuitry is further configured to:
   in response to determining that a rotational speed of the first propulsor is less than or equal to a threshold speed:
      open the second switch to cause the second AC current to flow through the second power electronics circuit of the second current path,
      control the second power electronics circuit to reduce a frequency of the second AC current to cause rotation of the second propulsor to slow.

5. The distributed propulsion system of claim 1, wherein the control circuitry is configured to:
   open the first switch to cause the first AC current to flow through the first power electronics circuit of the first current path; and
   control the first power electronics circuit to increase a frequency of the first AC current to cause rotation of the first propulsor to quicken.

6. The distributed propulsion system of claim 5, wherein increasing the frequency of the first AC current causes the rotation of the first propulsor to increase from a first speed to a second speed, and wherein the control circuitry is further configured to:
   open the second switch to cause the second AC current to flow through the second power electronics circuit of the second current path to increase a frequency of the second AC current to be equal to the frequency of the first AC current, such that a rotational speed of the second propulsor is equal to a rotational speed of the first propulsor.

7. The distributed propulsion system of claim 1, wherein:
   the plurality of switches includes a third switch;
   in normal operation, the third switch is open, the first generator is electrically coupled to the first propulsor via one of the first current path or third current path and the second generator is electrically coupled to the second propulsor via one of the second current path or fourth current path;
   the control circuitry is configured to:
      determine whether a fault condition exists in the second generator or a connecting component; and
      in response to determining that fault condition is present, close the third switch to electrically couple the first generator to the second propulsor via one of the first, second, third, or fourth current paths.

8. The distributed propulsion system of claim 7, wherein the control circuitry is configured to close the third switch to couple the first generator to the second propulsor via one of the first or second current paths.

9. The distributed propulsion system of claim 1, wherein the power regulation circuit is a first power regulation circuit and the plurality of switches are a first plurality of switches, the system further comprising:
   a third propulsor and a fourth propulsor; and
   a second power regulation circuit electrically coupled to the third propulsor via a third output, the fourth propulsor via a fourth output, the first generator via a third input, and the second generator via a fourth input, wherein the second power regulation circuit comprises:
      a fifth current path comprising a third power electronics circuit,
      a sixth current path comprising a fourth power electronics circuit,
      a seventh current path that bypasses the third and fourth power electronics circuits,
      an eighth current path that bypasses the third and fourth power electronics circuits, and
      a second plurality of switches configured to selectively couple each respective input to a respective selected output to cause a respective current to flow from the respective input to the respective selected output via one of the fifth current path, the sixth current path, the seventh current path, or the eighth current path, the second plurality of switches including a third switch and a fourth switch, wherein the control circuitry is configured to:
cause the first AC current to flow through the fifth current path by at least opening the third switch;
cause the first AC current to flow through the seventh current path by at least closing the third switch;
cause the second AC current to flow through the sixth current path by at least opening the fourth switch; and
cause the second AC current to flow through the eighth current path by at least closing the fourth switch.

10. The distributed propulsion system of claim 9, wherein the third power electronics circuit comprises a third rectifier electrically coupled to a third inverter, and
wherein the fourth power electronics circuit comprises a fourth rectifier electrically coupled to a fourth inverter.

11. The distributed propulsion system of claim 9, wherein the control circuitry is further configured to:
open the first switch to cause the first AC current to flow through the first power electronics circuit of the first current path;
control the first power electronics circuit to reduce a frequency of the first AC current to cause rotation of the first propulsor to slow from a first speed to a second speed, and
in response to determining that the second speed is less than or equal to a threshold speed:
open the third switch to cause the second AC current to flow through the third power electronics circuit of the fifth current path; and
control the third power electronics circuit to increase a frequency of the second AC current received at the third propulsor to cause rotation of the third propulsor to quicken.

12. The distributed propulsion system of claim 9, wherein the first and second propulsors are located on a side of a vessel opposite the third and fourth propulsors.

13. The distributed propulsion system of claim 1, wherein the plurality of switches includes a third switch, the system further comprising:
a first electrical bus configured to provide the first AC current from the first generator to the power regulation circuit;
a second electrical bus configured to provide the second AC current from the second generator to the power regulation circuit;
a third propulsor selectively coupled to first electrical bus; and
a fourth propulsor selectively coupled to second electrical bus,
wherein the control circuitry is configured to synchronize the fourth propulsor to the second generator by at least being configured to:
decouple the second electrical bus from the second generator;
open the first switch to cause the first AC current to flow from the first generator to the first power electronics circuit via the first electrical bus;
regulate the first AC current to a frequency that is synchronized to a frequency of the second AC current generated by the second generator; and
close the third switch to couple the first current path to the fourth current path to cause the regulated first AC current to flow from the first power electronics circuit to the fourth propulsor via the second electrical bus.

14. The distributed propulsion system of claim 13, wherein the control circuitry is further configured to synchronize the fourth propulsor to the second generator by at least being configured to:
electrically decouple the first propulsor from the power regulation circuit by opening at least a fourth switch of the plurality of switches; and
electrically decouple the second propulsor from the power regulation circuit by opening at least a fifth switch of the plurality of switches.

15. The distributed propulsion system of claim 1, wherein the plurality of switches includes a third switch, and wherein the control circuitry is configured electrically couple the first generator to the second propulsor by at least closing the third switch.

16. A method comprising:
receiving, by a power regulation circuit of a distributed propulsion system, a first AC current from a first generator of the distributed propulsion system via a first input of the power regulation circuit, wherein the power regulation circuit is electrically coupled to a first propulsor via a first output;
receiving, by the power regulation circuit, a second AC current from a second generator of the distributed propulsion system via a second input of the power regulation circuit, wherein the power regulation circuit is electrically coupled to a second propulsor via a second output,
causing, by control circuitry of the distributed propulsion system, the first AC current to flow through a first current path by at least opening a first switch of a plurality of switches of the power regulation circuit, the first current path including a first power electronics circuit,
causing, by the control circuitry, the second AC current to flow through a second current path by at least opening a second switch of the plurality of switches, the second current path including a second power electronics circuit,
causing, by the control circuitry, the first AC current to flow through a third current path by at least closing the first switch, the third current path bypassing the first power electronics circuit and the second power electronics circuit, and
causing, by the control circuitry, the second AC current to flow through a fourth current path by at least closing the second switch, the fourth current path bypassing the first power electronics circuit and the second power electronics circuit.

17. The method of claim 16,
wherein the first power electronics circuit comprises a first rectifier electrically coupled to a first inverter, and
wherein the second power electronics circuit comprises a second rectifier electrically coupled to a second inverter.

18. A system comprising:
a power regulation circuit configured to selectively regulate a first AC current generated by a first generator and a second AC current generated by a second generator, output the first AC current to a first propulsor, and output the second AC current to a second propulsor, the power regulation circuit comprising:
a first current path comprising a first power electronics circuit, a second current path comprising a second power electronics circuit, a third current path that bypasses the first and second power electronics circuits, a fourth current path that bypasses the first and second power electronics circuits, and a plurality of switches configured to selectively routing the first AC current and the second AC current via one of the first current path, the second current path, the third current path, or the fourth current path, the plurality of switches including a first switch and a second switch; and control circuitry configured to:

cause the first AC current to flow through the first current path by at least opening the first switch;

cause the second AC current to flow through the second current path by at least opening the second switch;

cause the first AC current to flow through the third current path by at least closing the first switch; and cause the second AC current to flow through the fourth current path by at least closing the second switch.

19. The system of claim 18, wherein the first power electronics circuit comprises a first rectifier electrically coupled to a first inverter, and wherein the second power electronics circuit comprises a second rectifier electrically coupled to a second inverter.

20. The system of claim 18, wherein:

the plurality of switches includes a third switch;

in normal operation, the third switch is open, the first generator is electrically coupled to the first propulsor via one of the first current path or third current path and the second generator is electrically coupled to the second propulsor via one of the second current path or fourth current path;

the control circuitry is configured to:

determine whether a fault condition exists in the second generator or a connecting component; and in response to determining that fault condition is present, close the third switch to electrically couple the first generator to the second propulsor via one of the first, second, third, or fourth current paths.

* * * * *